(12) United States Patent
Farese et al.

(10) Patent No.: US 12,510,257 B2
(45) Date of Patent: Dec. 30, 2025

(54) ELECTROCHEMICALLY REGENERATED LIQUID DESICCANT DEHUMIDIFICATION SYSTEM USING A SECONDARY HEAT PUMP

(71) Applicant: Mojave Energy Systems, Inc., Palo Alto, CA (US)

(72) Inventors: Philip Farese, Palo Alto, CA (US); Brian Kienitz, Palo Alto, CA (US); Michael Benedict, Palo Alto, CA (US); Aaron Meles, Grand Rapids, MI (US); Eugene S. Beh, Portola Valley, CA (US); Benjamin A. Zhang, Palo Alto, CA (US); Francisco E. Torres, San Jose, CA (US)

(73) Assignee: Mojave Energy Systems, Inc., Sunnyvale, CA (US)

( * ) Notice: Subject to any disclaimer, the term of this patent is extended or adjusted under 35 U.S.C. 154(b) by 256 days.

(21) Appl. No.: 18/315,867

(22) Filed: May 11, 2023

(65) Prior Publication Data
US 2023/0280049 A1    Sep. 7, 2023

Related U.S. Application Data

(63) Continuation of application No. PCT/US2022/082272, filed on Dec. 22, 2022, which
(Continued)

(51) Int. Cl.
*F24F 3/14* (2006.01)

(52) U.S. Cl.
CPC ...... *F24F 3/1417* (2013.01); *F24F 2003/144* (2013.01); *F24F 2003/1458* (2013.01)

(58) Field of Classification Search
CPC .............. F24F 3/1417; F24F 2003/144; F24F 2003/1458; B01D 53/28; B01D 2259/4508; B01D 53/263
See application file for complete search history.

(56) References Cited

U.S. PATENT DOCUMENTS

| | | | |
|---|---|---|---|
| 2,147,248 A | | 2/1939 | Fleisher |
| 2,214,880 A | * | 9/1940 | Robert .................. F24F 3/1417 |
| | | | 62/76 |

(Continued)

FOREIGN PATENT DOCUMENTS

| | | |
|---|---|---|
| CN | 103288252 A | 9/2013 |
| CN | 105308317 A | 2/2016 |

(Continued)

OTHER PUBLICATIONS

Abdollahi and Shams, "Optimization of shape and angle of attack of winglet vortex generator in a rectangular channel for heat transfer enhancement," Applied Thermal Engineering, 2015;81:376-387.

(Continued)

*Primary Examiner* — Stephen Hobson
(74) *Attorney, Agent, or Firm* — COOLEY LLP

(57) ABSTRACT

A liquid desiccant regenerator configured to produce a first output stream with a higher concentration of a liquid desiccant than a first input stream. The regenerator also produces a second output stream with a lower concentration of the liquid desiccant than a second input stream. Regeneration of the liquid desiccant in the liquid desiccant regenerator decreases a temperature of the liquid desiccant regenerator. The system includes an air contactor coupled to the first output stream and exposing an input air stream to the first output stream. The first output stream absorbs water from the input air stream to form at least one diluted output desiccant stream. A heat pump of the system is thermally coupled to move the heat from the first output stream to the (Continued)

liquid desiccant regenerator. The heat moved to the liquid desiccant regenerator increases an efficiency of the liquid desiccant regenerator.

33 Claims, 9 Drawing Sheets

Related U.S. Application Data is a continuation-in-part of application No. 17/559,172, filed on Dec. 22, 2021, now Pat. No. 11,944,934.

(56) References Cited

U.S. PATENT DOCUMENTS

| | | | |
|---|---|---|---|
| 2,276,970 A | 3/1942 | Hyde | |
| 2,290,465 A | 7/1942 | Crawford | |
| 2,672,024 A | 3/1954 | Mcgrath | |
| 2,798,570 A * | 7/1957 | Kelley | F24F 3/1417 62/282 |
| 3,277,954 A | 10/1966 | Gershon | |
| 3,350,892 A | 11/1967 | Kelley | |
| 3,729,142 A | 4/1973 | Rangel et al. | |
| 3,819,118 A | 6/1974 | Brock et al. | |
| 3,981,452 A | 9/1976 | Eckstein | |
| 3,993,248 A | 11/1976 | Harmony | |
| 4,118,299 A | 10/1978 | Maget | |
| 4,164,125 A | 8/1979 | Griffiths | |
| 4,180,985 A * | 1/1980 | Northrup, Jr. | F24F 5/001 62/271 |
| 4,205,529 A | 6/1980 | Ko | |
| 4,259,849 A | 4/1981 | Griffiths | |
| 4,287,721 A | 9/1981 | Robison | |
| 4,355,683 A | 10/1982 | Griffiths | |
| 4,593,534 A | 6/1986 | Bloomfield | |
| 4,612,019 A | 9/1986 | Langhorst | |
| 4,691,530 A | 9/1987 | Meckler | |
| 4,700,550 A | 10/1987 | Rhodes | |
| 4,900,448 A | 2/1990 | Bonne et al. | |
| 4,905,479 A | 3/1990 | Wilkinson | |
| 4,941,324 A * | 7/1990 | Peterson | F24F 3/1411 62/271 |
| 4,955,205 A | 9/1990 | Wilkinson | |
| 4,984,434 A * | 1/1991 | Peterson | F24F 5/0014 62/271 |
| 5,022,241 A | 6/1991 | Wilkinson | |
| 5,058,394 A | 10/1991 | Wilkinson | |
| 5,070,703 A | 12/1991 | Wilkinson | |
| 5,351,497 A | 10/1994 | Lowenstein | |
| 5,460,004 A | 10/1995 | Tsimerman | |
| 5,528,905 A | 6/1996 | Scarlatti | |
| 5,586,727 A | 12/1996 | Shekalim | |
| 5,615,838 A | 4/1997 | Eckstein et al. | |
| 5,634,269 A | 6/1997 | Lowenstein et al. | |
| 5,797,272 A | 8/1998 | James | |
| 5,966,955 A | 10/1999 | Maeda | |
| 6,018,954 A | 2/2000 | Assaf | |
| 6,149,817 A | 11/2000 | Peterson et al. | |
| 6,159,352 A | 12/2000 | Riera et al. | |
| 6,187,201 B1 | 2/2001 | Abe et al. | |
| 6,463,750 B2 * | 10/2002 | Assaf | F24F 3/1417 62/93 |
| 6,487,872 B1 | 12/2002 | Forkosh et al. | |
| 6,497,107 B2 | 12/2002 | Maisotsenko et al. | |
| 6,497,749 B2 | 12/2002 | Kesten et al. | |
| 6,719,891 B2 | 4/2004 | Ruhr et al. | |
| 6,745,826 B2 | 6/2004 | Lowenstein et al. | |
| 6,976,365 B2 | 12/2005 | Forkosh et al. | |
| 6,986,428 B2 | 1/2006 | Hester et al. | |
| 7,083,730 B2 | 8/2006 | Davis | |
| 7,279,215 B2 | 10/2007 | Hester et al. | |
| 7,430,878 B2 | 10/2008 | Assaf | |
| 7,942,011 B2 | 5/2011 | Forkosh | |
| 7,942,387 B2 | 5/2011 | Forkosh | |
| 7,974,076 B2 | 7/2011 | Xiong et al. | |
| 7,977,395 B2 | 7/2011 | Lin et al. | |
| 7,992,855 B2 | 8/2011 | Awano | |
| 8,142,633 B2 | 3/2012 | Batchelder et al. | |
| 8,171,746 B2 * | 5/2012 | Miyauchi | B01D 53/1425 261/153 |
| 8,545,692 B2 | 10/2013 | James et al. | |
| 8,623,210 B2 | 1/2014 | Manabe et al. | |
| 8,685,142 B2 * | 4/2014 | Claridge | B01D 71/0281 95/52 |
| 8,696,805 B2 | 4/2014 | Chang et al. | |
| 8,769,971 B2 | 7/2014 | Kozubal et al. | |
| 8,769,972 B2 | 7/2014 | Bahar | |
| 8,790,454 B2 | 7/2014 | Lee et al. | |
| 8,800,308 B2 | 8/2014 | Vandermeulen et al. | |
| 8,801,910 B2 | 8/2014 | Bazant et al. | |
| 8,999,132 B2 | 4/2015 | Bazant et al. | |
| 9,000,289 B2 | 4/2015 | Vandermeulen et al. | |
| 9,086,223 B2 | 7/2015 | Vandermeulen et al. | |
| 9,101,874 B2 | 8/2015 | Vandermeulen | |
| 9,101,875 B2 | 8/2015 | Vandermeulen et al. | |
| 9,112,217 B2 | 8/2015 | Kim et al. | |
| 9,140,471 B2 | 9/2015 | Kozubal et al. | |
| 9,243,810 B2 | 1/2016 | Vandermeulen et al. | |
| 9,273,876 B2 | 3/2016 | Smith et al. | |
| 9,308,490 B2 | 4/2016 | Vandermeulen et al. | |
| 9,340,436 B2 | 5/2016 | Sahu et al. | |
| 9,506,697 B2 | 11/2016 | Vandermeulen | |
| 9,541,302 B2 | 1/2017 | Taylor et al. | |
| 9,546,426 B2 | 1/2017 | Logan et al. | |
| 9,548,620 B2 | 1/2017 | Hu et al. | |
| 9,631,824 B1 | 4/2017 | Maisey et al. | |
| 9,631,848 B2 | 4/2017 | Vandermeulen et al. | |
| 9,640,826 B2 | 5/2017 | Yan et al. | |
| 9,670,077 B2 | 6/2017 | Volkel et al. | |
| 9,673,472 B2 | 6/2017 | Volkel et al. | |
| 9,709,285 B2 | 7/2017 | Vandermeulen | |
| 9,835,340 B2 | 12/2017 | Vandermeulen et al. | |
| 9,905,876 B2 | 2/2018 | Schubert et al. | |
| 9,982,901 B2 | 5/2018 | Mongar | |
| 10,012,401 B2 * | 7/2018 | Forkosh | F24F 3/1417 |
| 10,024,558 B2 * | 7/2018 | Vandermeulen | F25B 13/00 |
| 10,124,296 B2 | 11/2018 | Pozzo et al. | |
| 10,302,317 B2 | 5/2019 | Erb et al. | |
| 10,443,868 B2 | 10/2019 | Vandermeulen et al. | |
| 10,525,417 B2 | 1/2020 | Newbloom et al. | |
| 10,550,014 B2 | 2/2020 | Desai et al. | |
| 10,604,426 B2 | 3/2020 | Connor, Jr. et al. | |
| 10,648,743 B2 | 5/2020 | Kozubal et al. | |
| 10,655,870 B2 * | 5/2020 | Lowenstein | F24F 3/1429 |
| 10,712,024 B2 | 7/2020 | LePoudre et al. | |
| 10,721,024 B2 | 7/2020 | Seo | |
| 10,821,395 B2 | 11/2020 | Beh et al. | |
| 10,822,254 B2 | 11/2020 | Desai et al. | |
| 10,962,252 B2 * | 3/2021 | LePoudre | F24F 3/147 |
| 11,015,875 B2 * | 5/2021 | Benedict | F25B 30/04 |
| 11,020,713 B2 * | 6/2021 | Demeter | C08J 5/2206 |
| 11,029,045 B2 | 6/2021 | Woods et al. | |
| 11,117,090 B2 | 9/2021 | Benedict et al. | |
| 11,149,970 B2 | 10/2021 | Bahar et al. | |
| 11,185,823 B2 | 11/2021 | Beh et al. | |
| 11,326,790 B2 | 5/2022 | Woods et al. | |
| 11,532,831 B1 * | 12/2022 | Beh | C07F 17/02 |
| 11,760,631 B2 * | 9/2023 | Chandran | B01D 29/27 422/162 |
| 11,944,934 B2 | 4/2024 | Benedict et al. | |
| 11,998,871 B2 | 6/2024 | Benedict et al. | |
| 12,050,022 B2 | 7/2024 | Ellman et al. | |
| 12,085,293 B2 | 9/2024 | Benedict et al. | |
| 2002/0038552 A1 | 4/2002 | Maisotsenko et al. | |
| 2003/0121271 A1 | 7/2003 | Dinnage et al. | |
| 2004/0118125 A1 | 6/2004 | Potnis et al. | |
| 2004/0168462 A1 | 9/2004 | Assaf | |
| 2004/0231512 A1 * | 11/2004 | Slayzak | B01D 53/263 96/290 |
| 2005/0183956 A1 | 8/2005 | Katefidis | |
| 2006/0130654 A1 * | 6/2006 | King | B01D 5/0045 95/231 |
| 2006/0141346 A1 | 6/2006 | Gordon et al. | |

(56) References Cited

U.S. PATENT DOCUMENTS

| | | | |
|---|---|---|---|
| 2009/0095162 A1* | 4/2009 | Hargis | B01D 53/263 |
| | | | 96/245 |
| 2009/0178436 A1 | 7/2009 | Chiriac | |
| 2010/0090356 A1 | 4/2010 | Sines et al. | |
| 2010/0175394 A1* | 7/2010 | Albers | F24F 3/1417 |
| | | | 62/271 |
| 2010/0275629 A1 | 11/2010 | Erickson | |
| 2011/0132027 A1 | 6/2011 | Gommed et al. | |
| 2012/0125020 A1* | 5/2012 | Vandermeulen | B01D 53/263 |
| | | | 62/235.1 |
| 2012/0304862 A1 | 12/2012 | Taylor et al. | |
| 2013/0056177 A1* | 3/2013 | Coutu | F24F 12/002 |
| | | | 165/104.11 |
| 2013/0118478 A1 | 5/2013 | Armstrong et al. | |
| 2013/0199220 A1 | 8/2013 | Ma et al. | |
| 2013/0319021 A1 | 12/2013 | Ball et al. | |
| 2013/0340449 A1 | 12/2013 | Kozubal et al. | |
| 2014/0054013 A1 | 2/2014 | LePoudre et al. | |
| 2014/0260367 A1 | 9/2014 | Coutu et al. | |
| 2014/0326433 A1 | 11/2014 | Kozubal | |
| 2015/0048777 A1 | 2/2015 | Goldstein | |
| 2015/0068225 A1 | 3/2015 | Laughman et al. | |
| 2015/0232348 A1 | 8/2015 | Jepson | |
| 2015/0260420 A1 | 9/2015 | Forkosh | |
| 2015/0291452 A1 | 10/2015 | Jikihara et al. | |
| 2015/0292754 A1 | 10/2015 | Mongar | |
| 2015/0300754 A1 | 10/2015 | Vandermeulen et al. | |
| 2015/0338140 A1* | 11/2015 | Vandermeulen | F24F 3/1417 |
| | | | 62/238.3 |
| 2016/0102874 A1* | 4/2016 | Buchholz | F24F 5/0014 |
| | | | 62/271 |
| 2017/0145803 A1 | 5/2017 | Yeh et al. | |
| 2017/0241654 A1* | 8/2017 | Lowenstein | F24F 3/1429 |
| 2017/0292722 A1 | 10/2017 | Vandermeulen | |
| 2017/0370598 A1 | 12/2017 | Hamlin et al. | |
| 2018/0036675 A1 | 2/2018 | Antony Prince et al. | |
| 2018/0187906 A1 | 7/2018 | Bahar et al. | |
| 2018/0191012 A1 | 7/2018 | Zhang et al. | |
| 2018/0328602 A1 | 11/2018 | Vandermeulen | |
| 2019/0145639 A1* | 5/2019 | Allen | F28D 21/0015 |
| | | | 62/94 |
| 2019/0240614 A1 | 8/2019 | Beh et al. | |
| 2019/0240623 A1* | 8/2019 | Beh | B01D 61/423 |
| 2019/0285290 A1* | 9/2019 | Woods | F24F 3/1417 |
| 2019/0331353 A1* | 10/2019 | Edström | B01D 53/1425 |
| 2020/0039314 A1 | 2/2020 | Minakuchi et al. | |
| 2020/0063995 A1* | 2/2020 | LePoudre | F24F 6/02 |
| 2020/0070094 A1 | 3/2020 | Hussaini et al. | |
| 2020/0096212 A1* | 3/2020 | LePoudre | F24F 5/0014 |
| 2020/0164302 A1* | 5/2020 | Benedict | H01M 8/227 |
| 2020/0164312 A1* | 5/2020 | Beh | B01D 53/1425 |
| 2020/0173671 A1* | 6/2020 | Rowe | F24F 3/06 |
| 2020/0182493 A1* | 6/2020 | Luttik | A01G 9/246 |
| 2020/0278126 A1* | 9/2020 | Ide | F24F 11/0008 |
| 2020/0326106 A1* | 10/2020 | Muthusubramanian | |
| | | | F24F 5/0014 |
| 2020/0333086 A1* | 10/2020 | Benedict | F24V 30/00 |
| 2020/0346164 A1* | 11/2020 | Verplancke | B01D 5/0051 |
| 2020/0384421 A1* | 12/2020 | Newbloom | C25B 9/23 |
| 2020/0388871 A1 | 12/2020 | Newbloom et al. | |
| 2020/0393145 A1* | 12/2020 | Woods | B01D 17/0202 |
| 2021/0254844 A1* | 8/2021 | Qasem | F24F 3/1417 |
| 2021/0283528 A1* | 9/2021 | Pokorný | B01D 5/0003 |
| 2021/0298246 A1 | 9/2021 | Lefers et al. | |
| 2021/0370228 A1 | 12/2021 | Benedict et al. | |
| 2021/0381701 A1* | 12/2021 | Masuda | F24F 11/77 |
| 2022/0193612 A1* | 6/2022 | Torres | B01D 61/463 |
| 2022/0223885 A1* | 7/2022 | Beh | B01D 61/461 |
| 2022/0243932 A1* | 8/2022 | Benedict | B01D 53/18 |
| 2022/0299223 A1* | 9/2022 | Benedict | B01D 53/18 |
| 2022/0410070 A1* | 12/2022 | Beh | B01D 61/463 |
| 2023/0141446 A1* | 5/2023 | Beh | B01D 61/50 |
| | | | 204/263 |
| 2023/0173433 A1* | 6/2023 | Benedict | C02F 1/46109 |
| 2023/0191312 A1* | 6/2023 | Benedict | B01D 53/1425 |
| | | | 95/193 |
| 2023/0264140 A1* | 8/2023 | Beh | H01M 8/188 |
| | | | 204/632 |
| 2023/0280049 A1* | 9/2023 | Farese | F24F 3/1417 |
| | | | 62/271 |
| 2023/0294038 A1* | 9/2023 | Wallace | C01B 3/025 |
| | | | 96/234 |
| 2023/0332780 A1* | 10/2023 | Meles | F24F 3/153 |
| 2024/0131468 A1 | 4/2024 | Morajkar | |
| 2024/0210050 A1* | 6/2024 | Ellman | B01D 53/265 |
| 2024/0337393 A1* | 10/2024 | Farese | B01D 53/263 |
| 2025/0090994 A1* | 3/2025 | Benedict | B01D 53/263 |
| 2025/0129950 A1* | 4/2025 | Ellman | F24F 3/1411 |
| 2025/0180235 A1* | 6/2025 | Benedict | B01D 53/18 |
| 2025/0216098 A1* | 7/2025 | Farese | F24F 3/1417 |

FOREIGN PATENT DOCUMENTS

| | | | | |
|---|---|---|---|---|
| CN | 206055832 U | 3/2017 | | |
| CN | 206291383 U | 6/2017 | | |
| CN | 108187459 A | 6/2018 | | |
| CN | 207455783 U | 6/2018 | | |
| CN | 207501630 U | 6/2018 | | |
| CN | 111964168 A | * 11/2020 | | F25B 43/006 |
| EP | 3060856 A1 | 8/2016 | | |
| EP | 3336064 A1 | 6/2018 | | |
| EP | 4063001 A1 | 9/2022 | | |
| JP | H0418919 A | 1/1992 | | |
| JP | H05245346 A | 9/1993 | | |
| JP | 2001174074 A | 6/2001 | | |
| JP | 2009544131 A | 12/2009 | | |
| JP | 2019141835 A | 8/2019 | | |
| KR | 20110080893 A | 7/2011 | | |
| KR | 20130106530 A | 9/2013 | | |
| KR | 20140046913 A | 4/2014 | | |
| KR | 20150034545 A | 4/2015 | | |
| KR | 20170030129 A | 3/2017 | | |
| WO | WO-9528609 A1 | 10/1995 | | |
| WO | WO-2011062808 A1 | 5/2011 | | |
| WO | WO-2012170887 A2 | 12/2012 | | |
| WO | WO-2014181898 A1 | 11/2014 | | |
| WO | WO-2015143332 A2 | 9/2015 | | |
| WO | WO-2017189850 A1 | 11/2017 | | |
| WO | WO-2018032003 A1 | 2/2018 | | |
| WO | WO-2018119280 A1 | 6/2018 | | |
| WO | WO-2018191806 A1 | 10/2018 | | |
| WO | WO-2019089971 A1 | 5/2019 | | |
| WO | WO-2020112592 A1 | 6/2020 | | |
| WO | WO-2020112712 A1 | 6/2020 | | |
| WO | WO-2023122749 A2 | 6/2023 | | |
| WO | WO-2023201184 A1 | 10/2023 | | |
| WO | WO-2024086450 A1 | 4/2024 | | |
| WO | WO-2024129618 A1 | 6/2024 | | |
| WO | WO-2024211820 A2 | 10/2024 | | |

OTHER PUBLICATIONS

Al-Jubainawi et al., "Factors governing mass transfer during membrane electrodialysis regeneration of LiCl solution for liquid desiccant dehumidification systems", Sustainable Cities and Society, (Aug. 26, 2016); 28:30-41.

Al-Karaghouli et al., "Energy consumption and water production cost of conventional and renewable-energy- powered desalination processes", Renewable and Sustainable Energy Reviews 2013, 24, 343-356.

Anderson et al., Capacitive deionization as an electrochemical means of saving energy and delivering clean water. Comparison to present desalination practices: Will it compete ?:, Electrochimica Acta 2010, 55 {12}, 3845-3856.

Arellano et al., "Effects of pH on the degradation of aqueous ferricyanide by photolysis and photocatalysis under Solar radiation", Solar Energy Materials and Solar Cells 2010, 94 {2}, 327-332.

Ashrae, et al., "Desiccant Dehumidification and Pressure Drying Equipment," 2012 ASHRAE Handbook-HVAC Systems and Equipment, Chapter 24, pp. 24.1-24.12.

(56) References Cited

OTHER PUBLICATIONS

Ashrae Standard, "Method of Testing for Rating Desiccant Dehumidifiers Utilizing Heat for the Regeneration Process", (2007); 4 pages.
Bajpayee et al., "Very low temperature membrane-free desalination by directional solvent extraction", Energy Environ. Sci. 2011,4 {5}, 1672.
Beh et al., "A Neutral pH Aqueous Organic-Organometallic Redox Flow Battery with Extremely High Capacity Retention" ACS Energy Lett, 2017, 2, pp. 639-644.
Biswas and Chattopadhyay, Heat Transfer in a Channel with Built-In Wing-Type Vortex Generators, Int J Heat Mass Transfer, 1992;35(4):803-814.
Biswas et al., "Numerical and experimental determination of flow structure and heat transfer effects of longitudinal vortices in a channel flow," Int J Heat Mass Transfer, 1996;39(16):3441-3451.
BTMAP-VI et al., "Ordering and Customer Service Neutral pH Aqueous Redox Flow Battery Materials", Jan. 1, 2017, pp. 639.
Chen et al., "Experimental and numerical heat transfer investigation of an impingement jet array with V-ribs on the target plate and on the impingement plate," Intl J Heat Fluid Flow, 2017;68:126-138.
Cheng et al., "Double-Stage Photovoltaic/Thermal ED Regeneration for Liquid Desiccant Cooling System", Energy and Buildings, 51,2012, pp. 64-72.
Cheng et al., "Experimental investigation of an electrodialysis regenerator for liquid desiccant", Energy and Buildings, (2013); 67:419-425.
Cheng et al, "Performance analysis of a new desiccant pre-treatment electrodialysis regeneration system for liquid desiccant", 2013 , Elsevier, 66, 1-15 (Year: 2013).
Conde-Petit and Weber, "Open Absorption System for Cooling and Air Conditioning using Membrane Contactors- Annual Report 2006," Publication No. 260098, Project: 101310-Open Absorption System for Cooling and Air Conditioning using Membrane Contactors, Date of publication: Nov. 14, 2006, Contractor: M. Conde Engineering, 13 pages.
Conde-Petit and Weber, "Open Absorption System for Cooling and Air Conditioning Using Membrane Contactors-Final Report," Publication No. 280139, Project: 101310-Open Absorption System for Cooling and Air conditioning using Membrane Contactors, Date of publication: Jul. 8, 2008, Contractor: M. Conde Engineering. 50 pages.
Conde-Petit, M. "Liquid Desiccant-Based Air-Conditioning Systems—LDACS," Proc. of the 1st European Conference on Polygeneration-Technologies and Applications, 217-234, A. Coronas, ed., Tarragona-Spain, Oct. 16-17, 2007 Published by CREVER-Universitat, 17 pages.
Conde-Petit, M. Open Absorption Systems for Air-Conditioning using Membrane Contactors, Proceedings '15. Schweizerisches Status-Seminar Energie-und Umweltforschung im Bauwesen', Sep. 11-12, 2008—ETH Zurich, Switzerland. Published by BRENET-Eggwilstr. 16a, CH-9552 Bronschhofen-Switzerland {brenet@vogel-tech.ch), 12 pages.
Conde-Petit, Manuel, "Open Absorption System for Cooling and Air Conditioning using Membrane Contactors-Annual Report 2005," Publication No. Publication 260097, Project: 101310-Open Absorption System for Cooling and Air conditioning using Membrane Contactors, Date of publication: Jan. 31, 2006, Contractor: M. Conde Engineering, 8 pages.
Cooling tower Fill material: Gain a Deep Understanding, Linquip Technews, available online [retrieved on 022-03-01]. Retrieved from the internet: URL: https://www.linquip.com/blog/cooling-tower-fill-materiala/; 3 pgs.
Dai, "Increasing drought under global warming in observations and models", Nat. Clim. Change 2013, 3(1):52-58.
Darling et al., "Pathways to low-cost electrochemical energy storage: a comparison of aqueous and nonaqueous flow batteries", Energy Environ. Sci. 2014, 7 {11}, 3459-3477.

DEAN and Lowenstein, "A Solar Liquid-Desiccant Air Conditioner for Low-electricity Humidity Control-Summary Report," Energy and Water Projects Demonstration Plan SI-0822; TP-7 M0-56437 -2, Nov. 2012; 41 pgs.
Desai et al., "Electrochemical Desalination of Seawater and Hypersaline Brines with Coupled Electricity Storage", ACS Energy Lett. 3, 2, 2018, pp. 375-379.
Desalination Experts Group, "Desalination in the GCC", 2014,47 pages.
Dipaola, "Saudi Arabia Gets Cheapest Bids for Solar Power in Auction" Bloomberg, Jan. 16, 2018, 3 pages.
Ebrahimi et al., "Numerical study of liquid flow and heat transfer in rectangular microchannel with longitudinal vortex generators," Applied Thermal Eng, 2015;78:576-583.
Epsztein et al., "Activation behavior for ion permeation in ion-exchange membranes: Role of ion dehydration in selective transport", Journal of Membrane Science 580, 2019, pp. 316-326.
European Search Report for EP22151282.5 issued by the European Patent Office, Jun. 3, 2022; 10 pgs.
Extended European Search Report for EP 22150661.1 issued by the European Patent Office on Jun. 9, 2022; 14 pgs.
Extended European Search Report for European Application No. 22157879.4, dated Aug. 26, 2022, 10 pages.
Ferguson et al., "Studies On Overvoltage. IX: The Nature of Cathode and Anode Discharge Potentials at Several Metal Surfaces1,2", J. Phys. Chem. 1937,42(2), 171-190.
Friedman et al. "Mapping Microscale Chemical Heterogeneity in Nation Membranes with X-ray Photoelectron Spectroscopy," Journal of the Electrochemical Society, (2018); 165(11):733-741.
Gao et al., "A review on integration and design of desiccant air-conditioning systems for overall performance improvements," Renewable and Sustainable Energy Reviews, Feb. 23, 2021;141:110809: 25 pgs.
Gentry and Jacobi, "Heat Transfer Enhancement on a Flat Plate using Delta-Wing Vortex Generators," ACRC Project 40, Jul. 1995:109 pgs.
Gong et al., "A zinc-iron redox-flow battery under $100 per kWh of system capital cost", Energy & Environmental Science, 2015. 5 pages.
Gong et al., All-Soluble All-Iron Aqueous Redox-Flow Battery, ACS Energy Letters, 2016, 1, pp. 89-93.
Gowin, "Examining the economics of seawater desalination using the DEEP code", Nuclear Power Technology Development Section, I. A. E. A., Ed. Vienna, Austria, (2000); 88 pages.
Gu et al., "A multiple ion-exchange membrane design for redox flow batteries", Energy Environ. Sci. 2014, 7 {9), 2986.
Guler et al. "Performance-determining membrane properties in reverse electrodialysis", Journal of Membrane Science, (2013); 446:266-276.
Hilbert et al., "Correlations between the Kinetics of Electrolytic Dissolution and Deposition of Iron: I . The Anodic Dissolution of Iron", Journal of The Electrochemical Society 1971, 118(12):1919-1926.
Howell et al., "Overview of the DOE VTO Advanced Battery R&D Program", (Jun. 6, 2016); 24 pages.
Hu et al, "Long-Cycling Aqueous Organic Redox Flow Battery {AORFB) toward Sustainable and Safe Energy Storage", Journal of the American Chemical Society 2017, 139 {3), 1207-1214.
International Preliminary Report of Patentability for International Application No. PCT/US2019/062924, dated May 25, 2021, 9 pages.
International Search Report and Written Opinion for International Application No. PCT/US2019/062924, mailed Mar. 9, 2020, 12 pages.
International Search Report and Written Opinion for International Application No. PCT/US2019/063157, mailed Mar. 9, 2020, 11 pages.
Invitation to Pay Additional Fees for International Application PCT/US2022/82272, mailed Apr. 7, 2023, 02 pages.
John et al., Seasonal cycles of temperature, salinity and water masses of the western Arabian gulf, Oceanol. Acta 1990, 13 {3), 273-281.

(56) References Cited

OTHER PUBLICATIONS

Kaibara et al., "Study of Ion Transport across Amphoteric Ion Exchange Membrane. II. Transport of Symmetric Tetraalkylammonium Chlorides", Bull. Chem. Sco. Jpn, 56, 1983, pp. 1346-1350.
Khawaji et al., "Advances in seawater desalination technologies", Desalination 2008, 221 {1-3), 47-69.
Konopka et al., "Diffusion coefficients of ferri- and ferrocyanide ions in aqueous media, using twin-electrode thin- layer electrochemistry", Anal. Chem. 1970,42 (14), 1741-1746.
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
Lazard's Levelized Cost of Storage- Version 2.0. 2016, 46 pages.
Lee et al., "Desalination of a thermal power plant wastewater by membrane capacitive deionization", Desalination 196, 2006, pp. 125-134.
Lee et al., "Rocking chair desalination battery based on Prussian blue electrodes", ACS Omega 2017, 2 (4), 1653-1659.
Li et al., "Numerical simulation on flow and heat transfer of fin-and-tube heat exchanger with longitudinal vortex generators," IntlJThermalSci;2015;92:85-96.
Li et al., "Photovoltaic-electrodialysis regeneration method for liquid desiccant cooling system", Solar Energy, vol. 83, 2009, pp. 2195-2204.
Li, F., et al., "Novel spacers for mass transfer enhancement in membrane separations," Journal of Membrane Science, May 2005; 253{1-2): 1-12.
Ling, Y., et al., "CFD simulation of fluid flow through spacer-filled membrane module: selecting suitable cell types for periodic boundary conditions," Desalination, 2008; 233(1):351-358.
Logan et al., "Membrane-based processes for sustainable power generation using water", Nature 2012, 488, 313.
Loutatidou, et al., "Capital cost estimation of RO plants: GCC countries versus southern Europe", Desalination 2014, 347, 103-111.
Lu et al., "Numerical simulation on performances of plane and curved winglet-Pair vortex generators in a rectangular channel and field synergy analysis," Intl J Thermal Sci, 2016;109:323-333.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.
Oren, "Capacitive deionization (CDI) for desalination and water treatment- past, present and future (a review)", Desalination 2008, 228 (1-3), 10-29.
Pasta et al., "A desalination battery" Nano Lett.2012, 12 (2), 839-43.
Patankar and Prakash, "An Analysis of the Effect of Plate Thickness on Laminar Flow and Heat Transfer in Interrupted-Plate Passages," Intl J Heat Mass Transfer, 1981;24(11):1801-1810.
Patil et al., "Diffusivity of some zinc and cobalt salts in water", J. Chem. Eng. Data 1993, 38 (4), 574-576.
Petrova et al., "Perfluorinated hybrid membranes modified by metal decorated clay nanotubes", Journal of Membrane Science, vol. 582, Jul. 15, 2019, pp. 172-181.
Pismenskaya et al., "Can the electrochemical performance of heterogeneous ion-exchange membranes be better than that of homogeneous membranes?", Journal of Membrane Science, vol. 566, Nov. 15, 2018, pp. 54-68.
Sadrzadeh et al., "Sea water desalination using electrodialysis", Desalination 2008, 221 (1), 440-447.
Schaetzle et al., "Salinity Gradient Energy: Current State and New Trends", Engineering, vol. 1, Issue 2, Jun. 2016, pp. 164-166.
Scialdone et al., "Investigation of electrode material- Redox couple systems for reverse electrodialysis processes. Part 1: Iron redox couples", Journal of Electroanalytical Chemistry 2012, 681 (Supplement C), 66-75.
Scialdone et al., "Investigation of electrode material- redox couple systems for reverse electrodialysis processes- Part II: Experiments in a stack with 10-50 ce", Journal of Electroanalystical Chemistry, vol. 704, Jun. 14, 2013, pp. 1-9.
Seto et al., "Seawater desalination by electrodialysis," Desalination, (1978); 25(1):1-7.
Shah et al., "Comparative Studies on Performance of Interpolymer and Heterogeneous ion-Exchange Membranes for Water Desalination by Electrodialysis", Desalination 172,2005, pp. 257-265.
Shamshery et al., "Modeling the future of irrigation: A parametric description of pressure compensating drip irrigation miller performance," PLoS ONE, 2017; 12{4}:e0175241: 24 pgs.
Solveichik, "Flow batteries: current status and trends", Chem. Rev. 2015, 115 (20), 11533-58.
Song et al., "Interaction of counter rotating longitudinal vortices and the effect on fluid flow and heat transfer," Intl J Heat Mass Transfer, 2016;93:349-360.
Stillwell et al., "Predicting the specific energy consumption of reverse osmosis desalination", Water 2016, 8 (12).
Tiggelbeck et al., "Experimental investigations of heat transfer enhancement and flow losses in a channel with double rows of longitudinal vortex generators," Intl J Heat Mass Transfer, 1993;36(9):2327-2337.
Two Stage Regenerator, AIL Research, Inc., available online [retrieved on Mar. 1, 2022]. Retrieved from the Internet: URL: http://ailr.com/our-technology/two-stage-regenerator/; 1 pg.
Urban, "Emerging Scientific and Engineering Opportunities within the Water-Energy Nexus", Joule, Dec. 20, 2017, pp. 665-688.
US Dept. of Energy, "Desiccant Enhanced Evaporative Air-Conditioning (DEVap): Evaluation of a New Concept in Ultra Efficient Air Conditioning," Technical Report NREL/TP-5500-49722, (2011), 71 pages.
US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010,2014, 64 pages.
U.S. Office Action for U.S. Appl. No. 16/200,309, filed Apr. 20, 2022; 23 pgs.
Vermaas et al., "High Efficiency in Energy Generation from Salinity Gradients with Reverse Electrodialysis", ACS Sustainable Chem. Eng. 1, 2013, pp. 1295-1302.
Viswanathan et al., Cost and performance model for redox flow batteries, Journal of Power Sources, (2012); 247:1040-1051.
Vitillo et al., "Flow analysis of an innovative compact heat exchanger channel geometry," Intl J Heat Fluid Flow, 2016;58:30-39.
Wang et al., "Continuous desalination with a metal-free redox-mediator", Journal of Materials Chemistry A, No. 7, 2019, 7 pages.
Woods, "Membrane processes for heating, ventilation, and air conditioning", Renewable and Sustainable Energy Reviews, vol. 33, 2014, pp. 290-304.
Wu and Tao, "Effect of longitudinal vortex generator on heat transfer in rectangular channels," AppliedThermalEngineering;2012;37:67-72.
Wu and Tao, "Numerical Study on laminar convection heat transfer in a channel with longitudinal vortex generator. Part B: Parametric study of major influence factors," Intl J Heat Mass Transfer, 2008;51:3683-3692.
Wu et al., "Kinetic study on regeneration of Fe(II)EDTA in the wet process of NO removal", Chemical Engineering Journal 2008, 140 (1), 130-135.
Ye et al., "Performance of a mixing entropy battery alternately flushed with wastewater effluent and seawater for recovery of salinity gradient energy", Energy Environ. Sci. 2014, 7 (7), 2295-2300.

(56) References Cited

OTHER PUBLICATIONS

Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.

Zhang et al., "Performance optimization of heat pump driven liquid desiccant dehumidification systems," Energy and Buildings, Jun. 9, 2012;52:132-144.

Zhang et al., "The mechanism of heat transfer enhancement using longitudinal vortex generators in a laminar channel flow with uniform wall temperature," Intl J Thermal Sci, 2017;117:26-43.

International Search Report and Written Opinion for International Application No. PCT/US2022/82272, mailed on Jun. 23, 2023, 15 pages.

US Office Action for U.S. Appl. No. 17/559,172, dated Sep. 26, 2023, 7 pages.

International Preliminary Report of Patentability for International Application No. PCT/US2022/082272, dated Jul. 4, 2024, 9 pages.

Google Search for "liquid desiccant air conditioning electrodialysis" dated Mar. 9, 2021, 2 pages.

Guo, Y., et al., "Using electrodialysis for regeneration of aqueous lithium chloride solution in liquid desiccant air conditioning systems," Energy and Buildings, 2016, 116, pp. 285-295.

Kalpana et al., "Developments in liquid dessicant dehumidifcation system integrated with evaporative cooling technology," International Journal of Energy Research, vol. 46, No. 1, Apr. 2, 2021, pp. 61-88.

\* cited by examiner

ELECTROCHEMICALLY REGENERATED LIQUID DESICCANT DEHUMIDIFICATION SYSTEM USING A SECONDARY HEAT PUMP

CROSS-REFERENCE TO RELATED APPLICATIONS

This application is a continuation of International Application No. PCT/US2022/082272, filed Dec. 22, 2022, entitled "Electrochemically Regenerated Liquid Desiccant Dehumidification System Using a Secondary Heat Pump," which is a continuation-in-part of U.S. patent application Ser. No. 17/559,172, entitled "Electrochemically Regenerated Liquid Desiccant Dehumidification System Using a Secondary Heat Pump," filed Dec. 22, 2021, now U.S. Pat. No. 11,944,934), the disclosure of each of which is incorporated herein by reference in its entirety.

TECHNICAL FIELD

This disclosure relates generally to systems that utilize electrochemical regeneration of a liquid desiccant.

SUMMARY

Embodiments described herein are directed to a heat pump system using an electrodialysis apparatus. In one embodiment, a system includes a liquid desiccant regenerator configured to produce a first output stream from a first input stream. The first output stream has a higher concentration of a liquid desiccant than the first input stream. The regenerator also produces a second output stream from a second input stream. The second output stream has a lower concentration of the liquid desiccant than the second input stream. Regeneration of the liquid desiccant in the liquid desiccant regenerator decreases a temperature of the liquid desiccant regenerator. The system includes an air contactor coupled to the first output stream and exposing an input air stream to the first output stream. The first output stream absorbs water from the input air stream to form at least one diluted output desiccant stream. The at least one diluted output desiccant stream is circulated back into the liquid desiccant regenerator. A heat pump of the system is thermally coupled to move the heat from the first output stream to the liquid desiccant regenerator. The heat moved to the liquid desiccant regenerator increases an efficiency of the liquid desiccant regenerator.

Other embodiments are directed to a system that includes a liquid desiccant regenerator configured to produce a first output stream from a first input stream. The first output stream has a higher concentration of a liquid desiccant than the first input stream. The regenerator also produces a second output stream from a second input stream. The second output stream has a lower concentration of the liquid desiccant than the second input stream. The system includes an air contactor coupled to the first output stream and exposing an input air stream to the first output stream. The first output stream absorbs water from the input air stream to form at least one diluted output desiccant stream. The at least one diluted output desiccant stream is circulated back into the liquid desiccant regenerator. The system includes a vapor compression heat pump having a refrigerant loop between a condenser and an evaporator. The system also includes a fluid loop between the evaporator and the air contactor, the fluid loop thermally coupled to move the heat from the air contactor to the evaporator.

In another embodiment, a method involves producing a first output stream from a first input stream in a liquid desiccant regenerator, the first output stream having a higher concentration of a liquid desiccant than the first input stream. A second output stream is produced from a second input stream in the liquid desiccant regenerator, the second output stream having a lower concentration of the liquid desiccant than the second input stream. An input air stream is exposed to the first output stream in an air contactor. The first output stream absorbs water from the input air stream to form at least one diluted output desiccant stream. The at least one diluted output desiccant stream is recirculated back into the liquid desiccant regenerator. Heat is moved from the first output stream to the liquid desiccant regenerator via a heat pump.

In some embodiments, a system includes a liquid desiccant regenerator that is configured to produce a first output stream from a first input stream. The first output stream has a higher concentration of a liquid desiccant than the first input stream. The liquid desiccant regenerator is also configured to produce a second output stream from a second input stream. The second output stream has a lower concentration of the liquid desiccant than the second input stream. The system further includes an evaporator configured to be coupled to and remove heat from an input air stream to produce a cooled input air stream. The system during includes an air contactor coupled to the first output stream and the cooled input air stream to expose the cooled input air stream to the first output stream such that the first output stream absorbs water from the cooled input air stream to form a diluted output desiccant stream and dehumidified output air stream. The diluted output desiccant stream is circulated back into the liquid desiccant regenerator.

In some embodiments, a system includes a liquid desiccant regenerator configured to produce a first output stream from a first input stream in which the first output stream has a higher concentration of a liquid desiccant than the first input stream. The regenerator is also configured to produce a second output stream from a second input stream in which the second output stream has a lower concentration of the liquid desiccant than the second input stream. The system further includes an air contactor configured to be coupled to the first output stream to expose an input air stream to the first output stream. The first output stream absorbs water from the input air stream to form a diluted output desiccant stream and a dehumidified air stream. The diluted output desiccant stream is circulated back into the liquid desiccant regenerator. The system further includes an evaporator configured to be coupled to and remove heat from the dehumidified air stream to produce a cooled dehumidified air stream.

In some embodiments, a system includes a liquid desiccant regenerator configured to produce a series of output streams with each output stream from the series of output streams being configured to possess a concentration of liquid desiccant. In some implementations, the concentration of liquid desiccant can be different across each output stream. The system further includes an evaporator configured to be coupled to and remove heat from an input air stream to produce a cooled input air stream. The system further includes a series of air contactors. Each air contactor is configured to be coupled to one or more of the series of output streams to form a diluted output desiccant stream and an input air stream to form a dehumidified output air stream. The diluted output desiccant stream is circulated back into the liquid desiccant regenerator. The first in the series of air contactors is coupled to the cooled input air stream, and each subsequent contactor is coupled to the air output by the contactor upstream of it (i.e., toward the evaporator), and the final air contactor in the series producing a dehumidified air stream.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure relates to electrochemically regenerated liquid desiccant dehumidification systems. A liquid desiccant system may be used in, among other things, heating, ventilation, and air-conditioning (HVAC). Air conditioning is an energy intensive process and is responsible for nearly 10% of U.S. electricity consumption, with dehumidification accounting for more than half of the energy load in humid regions. The systems described herein provide an efficient, thermodynamic approach to dehumidification for air conditioning including a redox-assisted electrodialysis liquid desiccant regenerator that utilizes a heat pump.

Liquid desiccants (e.g., aqueous solutions of lithium chloride, LiCl and/or other salt such as NaCl, LiBr, and $CaCl_2$)) will absorb moisture from air across an air-to-liquid interface (e.g., a membrane interface), which decreases concentration of the desiccant solute, resulting in a diluted output stream of liquid desiccant. In order to regenerate the liquid desiccation system in a loop, the diluted liquid desiccants can be efficiently re-concentrated using a redox-assisted regenerator. This type of regenerator, referred to as a shuttle-promoted electrolyte removal (SUPER) cell, can increase or decrease concentrations of solutes in solutions through the use of ionic transport membranes and a redox shuttle.

Figure 1:
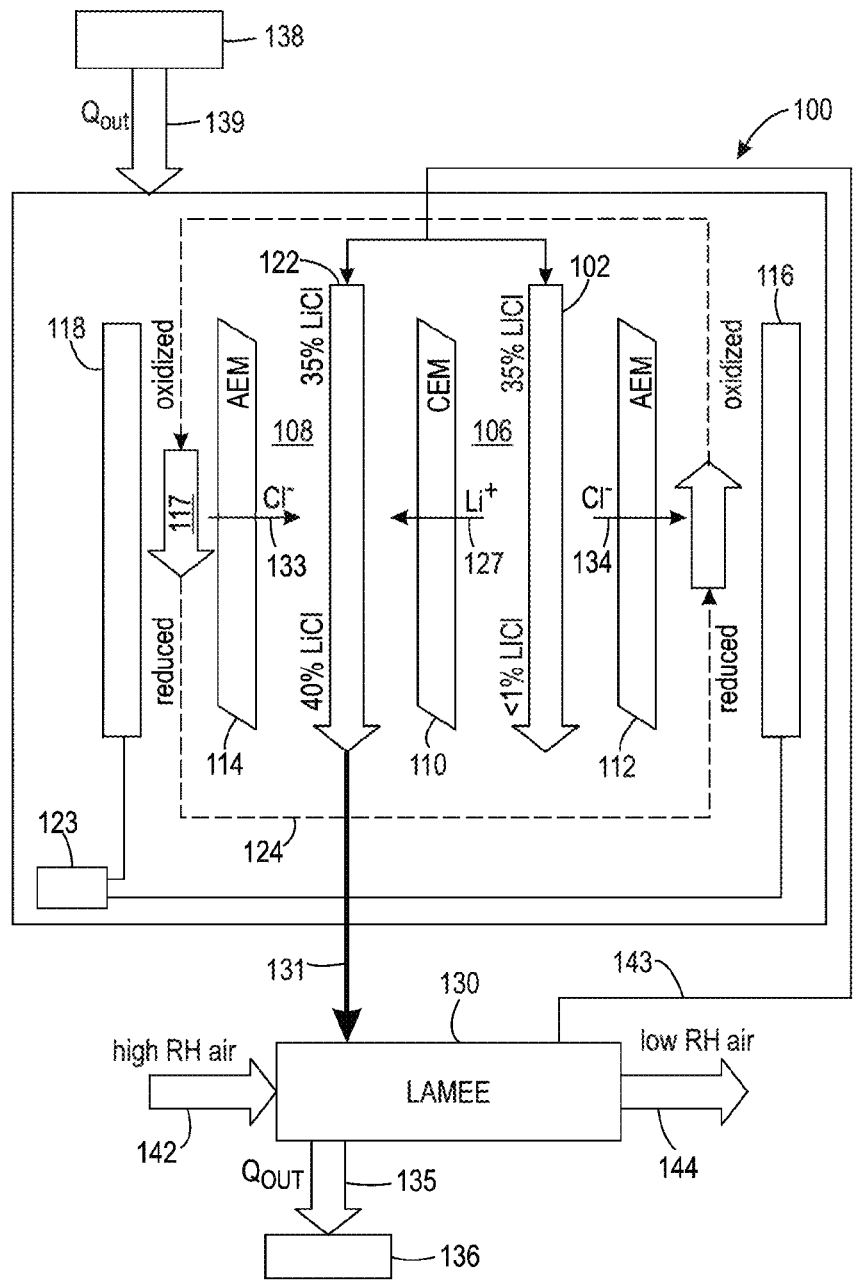
FIG. 1 is a diagram of a redox flow electrochemical regenerator stack and liquid desiccant system according to an example embodiment.

In FIG. 1, a diagram shows a SUPER cell 100 according to an example embodiment. The cell 100 includes two electrodes 116, 118, at least three ion exchange membranes 110, 112, 114, and an energy supply 123. The first electrode 116 contacts a first solution of a first redox-active electrolyte material and configured to have a first reversible redox reaction with the first redox-active electrolyte material. The second electrode 118 contacts a second solution of a second redox-active electrolyte material and configured to have a second reversible redox reaction with the second redox-active electrolyte material. For purposes of simplicity, the first and second redox-active electrolyte solutions are shown in the FIG. 1 as a single redox shuttle solution 117 comprising the redox-active electrolyte materials.

Examples of a redox shuttle solution include 1,1'-bis((3-trimethylammonio)propyl)ferrocene ($[BTMAP-Fc]^{2+}$) and 1,1'-bis((3-trimethylammonio)propyl)ferrocenium ($[BTMAP-Fc]^{3+}$), or 1,1'-bis((3-dimethylethylammonio)propyl)ferrocene ($[BDMEAP-Fc]^{2+}$) and 1,1'-bis((3-dimethylethylammonio)propyl)ferrocenium ($[BDMEAP-Fc]^{3+}$), which are highly stable ferrocene derivatives that have very rapid electrochemical kinetics and negligible membrane permeability, or ferrocyanide/ferricyanide ($[Fe(CN)_6]^{4-}/[Fe(CN)_6]^{3-}$). Additional details for example redox shuttle solutions can be found in commonly-owned U.S. patent application Ser. No. 17/390,600, filed Jul. 30, 2021, which is hereby incorporated by reference in its entirety.

The redox shuttle 117 is circulated between the two electrodes 116, 118 as shown by redox shuttle loop 124. When an electrical potential is applied to each electrode 116, 118 by energy supply 123, the redox shuttle is oxidized at a first electrode (e.g., 116) and reduced at the opposite electrode (e.g., 118). The energy supply 123 may be any variety of direct current (DC) energy supply such as a battery, photovoltaic panel, galvanic cell, potentiostat, AC/DC power converter, etc., and the energy supply may be contained within the electrochemical cell 100 or be external and coupled to the cell 100. Thus, as the shuttle 117 circulates between the electrodes, the portions of the shuttle 117 are continuously alternating between the redox states. In other words, the electrical potential engenders faradaic reactions happening at the two different electrodes 116, 118 and the redox material undergoing the faradaic reactions is circulated from one electrode to the other and back again.

In certain embodiments, each electrode 116, 118 may contact separate redox-active solutions instead of the same redox shuttle solution 117 being flowed in a loop. The separate redox-active solutions may have the same redox-active electrolyte material or different redox-active electrolyte materials. When different redox-active solutions are used for the respective electrodes 116, 118, the energy supply may periodically reverse the potential supplied to the electrodes to restore the state of charge (e.g., the proportion of redox-active electrolyte material in each solution that is in the oxidized state compared to the reduced state) of each of the redox-active electrolyte material solutions.

Positioned between the electrodes 116, 118 are three ion exchange membranes, which alternate in the type of ion exchanged. For example, among three membranes, a center membrane 110 may be a cation exchange membrane flanked by second 112 and third 114 anion exchange membranes, as is shown in FIG. 1. However, in other embodiments, the center, first membrane may be an anion exchange membrane and the second and third membranes may be cation exchange membranes. The membranes 110, 112, 114 define chambers, channels, or reservoirs, in the electrochemical cell 100. As may be seen, a first membrane 110 and a second membrane 112 define a first chamber 106, which in this example is configured as a desalinate chamber that decreases salt concentration in a fluid. The first membrane 110, in combination with a third membrane 114, also defines a second chamber 108, which in this example is configured as a salinate channel that increases salt concentration in a fluid.

The membranes 110, 112, 114 are ion-selective as well as water-permeable, are insoluble in organic solvents, and are inert (e.g., do not chemically change) in the reaction mixture and/or products. In certain embodiments, the membranes are reinforced with a polymer mesh integrated into the membrane itself and in other embodiments, the membranes are not reinforced. It will be understood that this can be extended to additional membranes, e.g., N membranes of alternating type that define respective N-1 channels or reservoirs.

A first stream 102 flows through the first chamber 106 of the electrochemical cell 100. The first stream 102 includes at least a solvent (water in this example) and a salt (LiCl in this example) dissolved in the solvent at a first salt concentration (about 35% by weight in this example) when it enters the first chamber 106. A second stream 122 flows through the second chamber 108 of the electrochemical cell 100. The second stream 122 has a second salt concentration (about 35% by weight) as it enters the first chamber. The second salt concentration is the same as the first salt concentration in this example, although could be different. During an operational mode of the electrochemical cell 100, an electrical potential is applied to the electrodes 116, 118 and the first and second streams 102, 122 are moved (e.g., pumped) through the first and second chambers 106, 108.

When an electrical potential is applied to the electrodes 116, 118, the redox shuttle 117 is oxidized at one electrode 116 and reduced at the other electrode 118, thereby driving salt ions 127 from the first stream 102 in the first chamber 106 into the second stream 122 in the second chamber 108. In particular, the redox shuttle 117 at the first electrode 116 accepts at least one ion 134 from the catalyst in the first chamber 106. The redox shuttle 117 at the second electrode 118 drives at least one ion 133 into the second stream 122 in the second chamber 108, and the charge is balanced by driving at least one ion 127, of opposite sign of charge to ions 133, 134, from the first stream 102 in the first channel 106 across the center membrane 110 into the second stream 122 in the second channel 108.

The result of the electrical potential being applied to the electrodes is that the first stream 102 has a reduced concentration of salt (e.g., below a 1% threshold concentration) during the operation mode when exiting the first chamber 106 and the second stream 122 increases in concentration of salt when exiting the second chamber 108. The outputs of the first and second chambers 106, 108 can be further processed by subsequent stages of a similar SUPER cell to achieve similar or increased levels of desalinization and salinization. Such a system may be used with various other salts, such as water-soluble ionic salts. Example cations that can be present in the salts include, but are not limited to, hydronium, lithium, sodium, potassium, magnesium, calcium, aluminum, zinc, and iron. Example anions that can be present in the salts include, but are not limited to, chloride, bromide, iodide, halide oxyanions, sulfur oxyanions, phosphorous oxyanions, and nitrogen oxyanions.

As noted above, the SUPER cell 100 can be used to regenerate a liquid desiccant stream that flows through a liquid-to-air heat and mass exchanger, including a direct contactor, packed bed air contactor, or liquid-to-air membrane energy exchanger (LAMEE) 130, which is shown in FIG. 1 coupled to the SUPER cell 100. For the purposes of this disclosure, instances of a LAMEE shown in any of the embodiments may be replaced with and/or augmented with any type of direct contact or membrane liquid-to-air heat and mass exchanger.

As seen in FIG. 1, the second, concentrated stream 122 is used as an input 131 to the LAMEE 130. The LAMEE 130 receives an input air stream 142 with relatively high relative humidity (RH), and water vapor in the input air stream 142 is absorbed into the liquid desiccant. This results in the LAMEE 130 outputting an output air stream 144 with a relatively low RH. The water being absorbed in the liquid desiccant results in a diluted output stream 143 from the LAMEE 130, which can be fed back into the SUPER cell. In this case, the output of the first, diluted stream 102 can be discarded or used elsewhere.

The absorption of water into the liquid desiccant results in an increase in the temperature of air 142, 144 flowing through the LAMEE 130, which is a well-known thermodynamic phenomenon when water condenses from a gas to a liquid. This increase in temperature can be reduced or eliminated by heat absorbing/accepting element 136 (e.g., heat exchanger) that absorbs heat energy 135 from the LAMEE 130. Heat can also influence energy consumption of the SUPER cell 100. For example, running the SUPER at higher temperatures can make its operation more efficient, e.g., by lowering the electrical resistance of the membranes/electrodes/solutions and increasing the electrochemical kinetics. Therefore, a heat emitting/rejecting element 138 (e.g., heat exchanger) can supply heat 139 to the SUPER cell 100 and/or any of its internal flows. For instance, applying heat to specific components or fluid streams in the SUPER can be used to induce a temperature gradient inside the SUPER to encourage favorable phenomenon (like resistance) and discourage unfavorable phenomenon (like water osmosis). In a SUPER design with multiple stages, heat can be applied to specific stages to promote favorable performance. Inputting heat to SUPER cell 100 can also compensate for the endothermic effects due to regeneration of the liquid desiccant.

Specific subsets of components of the SUPER cell 100 can be heated via the heat rejecting element 138 using conventional heat transfer elements, such as heat conductive structures, vapor chamber heat pipes, convective transfer from heat sinks, etc. In one embodiment, heat from element 138 can be applied to one or more of the membranes 110, 112, 114 to lower electrical resistance. In another embodiment, heat from element 138 can be applied to one or more of the electrodes 116, 118 to lower electrical resistance. In another embodiment, the stream 143 input to the SUPER cell 100 may be heated before or after entering the cell. For example, heating the concentrated stream 122 while keeping the dilute stream 102 relatively cooler can reduce water osmosis across the center membrane 110. In other embodiments, the redox shuttle loop 124 may be heated.

Figure 2:
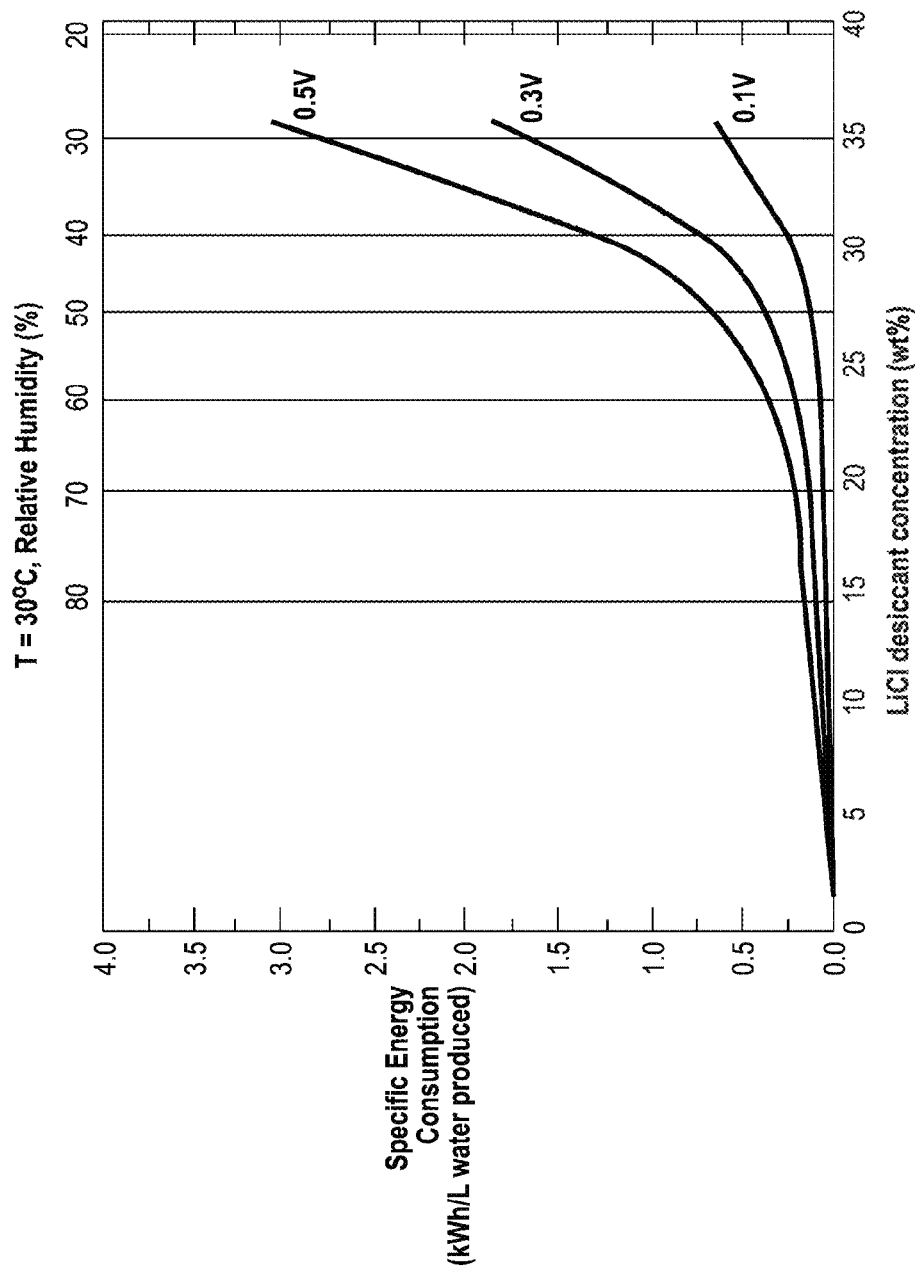
FIG. 2 is a graph showing power consumption under various conditions of a regenerator stack and liquid desiccant system according to an example embodiment.

The desiccant flow rate through the LAMEE 130 can also affect temperatures and system energy consumption. A high flow rate of liquid desiccant has low concentration change between the input stream 131 and the output stream 143. This may require more energy to reconcentrate the input stream 131 via the SUPER cell, as regeneration requires much more energy at higher concentrations. For example, the graph in FIG. 2 shows a marked increase in slope of the energy consumption curves for cell voltages from 0.1 to 0.5 volts once LiCl desiccant concentration is higher than 25-30% by weight. One the other hand, a high desiccant flow rate but may require less rejection of heat 135 from the LAMEE 130. A low flow rate of liquid desiccant through the LAMEE 130 increases the concentration change between the input stream 131 and the output stream 143. This can reduce the energy needed to reconcentrate the input stream 131 via the SUPER cell 100, although may increase the rejection of heat 135 from the LAMEE 130.

The heat absorbing element 136 and heat emitting element 138 may be thermally coupled to a same heat pump or two different heat pumps. Generally, a heat pump is a system that utilizes a heat transfer medium (e.g., gas, liquid, or solid) to move heat in a direction opposite that of spontaneous heat transfer. Well-known heat pump systems include vapor-compression (VC) cycle machines used in refrigerators and air-conditioning. A working fluid (e.g., refrigerant such as R-134A, R-407C, etc.) is compressed and condensed in a condenser. The compression and condensation cause a rise in fluid temperature which results in heat transfer to the outside air (OA) or other heat sink. The cooled working fluid is sent from the condenser to an expansion valve where it evaporates into an evaporator. The evaporation absorbs heat and the working fluid is sent back to the compressor to complete the cycle. This flow path of the working fluid is also referred to herein as a refrigerant loop.

Other types of heat pump systems include vapor absorption systems where a liquid refrigerant evaporates in a low partial pressure environment, absorbing heat from its surrounding. The vapor is then absorbed in another liquid, which is then heated to cause the refrigerant to evaporate out again. One advantage to absorption systems is that they can be built using no moving parts, other than the refrigerant itself. Other heat pumps, such as ground source heat pumps, utilize a constant temperature source (e.g., the earth) transfer heat to or from the ground using a working fluid, and may not need to rely on phase changes of the working fluid. Solids can be used as a heat pump media, such as in thermoelectric cooling devices.

The embodiments described herein improve the performance of electrochemically regenerated liquid desiccant dehumidifiers by use of a secondary heat pump. Generally, as the term is used herein, a primary heat pump moves heat between a heating/cooling target (e.g., forced air in an HVAC system or a water stream) and a thermal sink (e.g., the ground or atmosphere). A secondary heat pump includes additional heat exchangers in the primary heat pump path to heat or cool other components in the system. Many dehumidification systems use either a primary heat pump (as in the case of VC cycle air-conditioning) or a secondary heat pump (as in the case of a thermally regenerated desiccant wheel). The heat pump can be used to increase the relative humidity of air by cooling it, or to cool the air after dehumidification, compensating for heating caused by the dehumidification. In some embodiments, an electrochemically regenerated liquid desiccant system directly couples with the heat rejection (hot side) of the secondary heat pump, the heat accepting (cold side) of the secondary heat pump, or both.

Before discussing the heat pump aspects in greater detail, it will be understood that a liquid desiccant system as shown in FIG. 1 may employ more than one SUPER cell in order to improve efficiency. For example, changing concentration levels of the liquid desiccant solutions in smaller, discrete steps can minimize osmotic pressure differentials in each channel of the SUPER cells. Thus, in some embodiments, a SUPER liquid desiccant regenerator has two or more stages, each subsequent stage being configured to produce an output stream having a concentration of the liquid desiccant higher than the previous stage.

Figure 3:
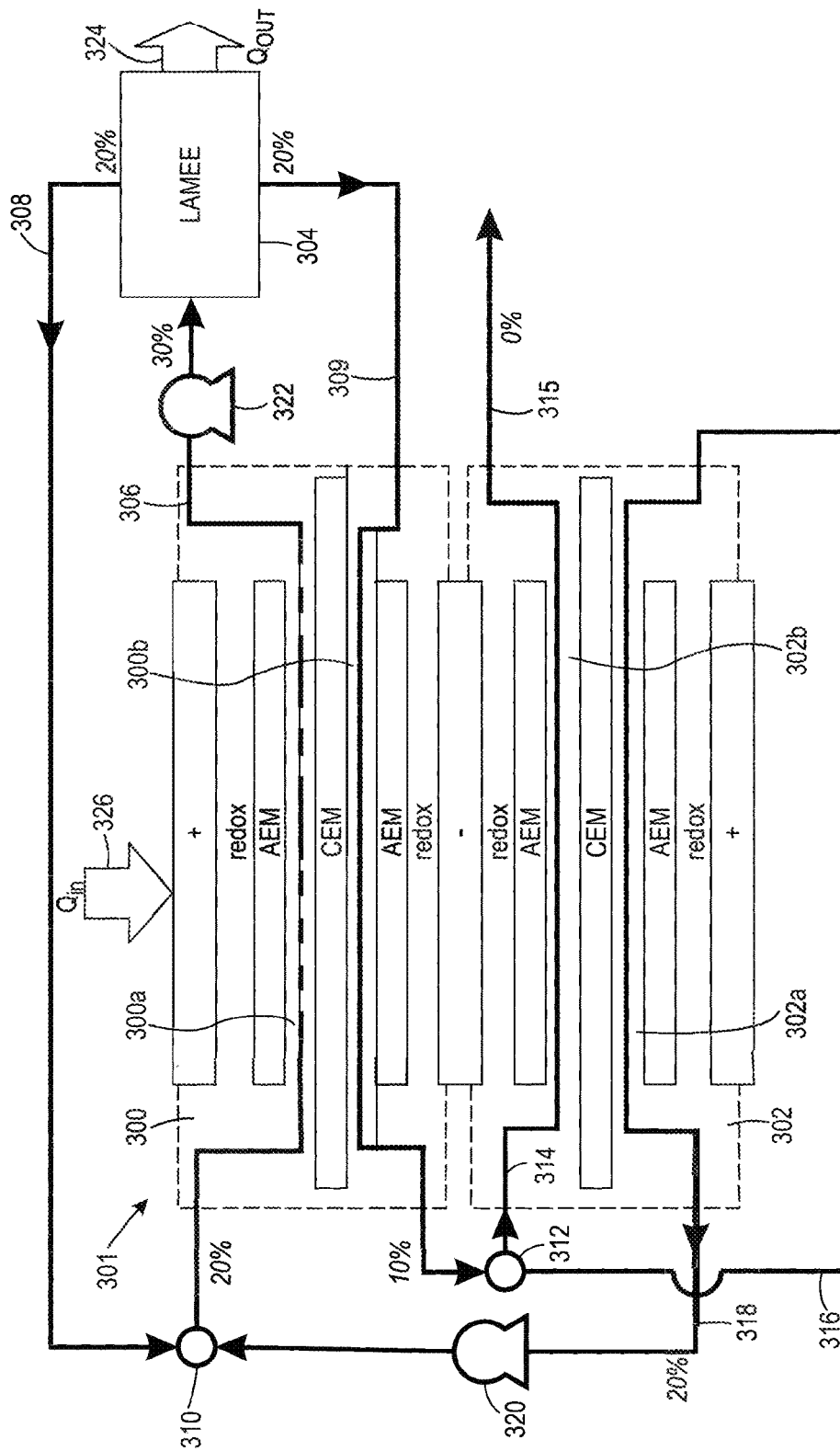
FIG. 3 is a diagram of a redox flow electrochemical regenerator stack and system according to another example embodiment.

In FIG. 3, a diagram shows how a stack 301 of two SUPER cells 300, 302 can be coupled together into a two-stage regenerator to increase efficiency in a liquid desiccant regeneration system. A LAMEE 304 receives a concentrated stream 306 of liquid desiccant from the first SUPER cell 300. The concentration level of the stream 306 is about 30% here, although these are estimated values provided for the purposes of illustration and not limitation. The LAMEE 304 causes water from an air flow (not shown) to be absorbed in the liquid desiccant, resulting in output streams 308, 309 having a lower concentration of desiccant, around 20% in this example. Note that the streams 308, 309 are shown exiting the LAMEE 304 separately, however may be joined to a common fluid port within or outside of the LAMEE 304.

The output stream 308 is fed back into a salinization channel 300a of the first SUPER cell 300 via a fluid junction 310 (e.g., T-junction or manifold), where it is regenerated to the input concentration. The other output stream 309 is fed into a desalinization channel 300b of the first SUPER cell 300, where it is desalinized to around 10% concentration. This lower concentration solution is divided at fluid junction 312, which sends a first stream 314 through a desalinization channel 302b of the second SUPER cell 302, resulting in a discharge stream 315 of low concentration, e.g., <1%. A second stream 316 of the lower concentration solution from junction 312 is sent into a salinization channel 302a of the second SUPER cell 302, where it comes out as an increased concentration stream 318 and is rejoined with LAMEE exit stream 308 at junction 310.

In this example the SUPER cell 302 forms a first stage, and the SUPER cell 300 forms a second stage. The subsequent, second stage produces an output stream having a concentration (30% in this example) of the liquid desiccant higher than the corresponding output stream of previous, first stage output. The corresponding output of the first stage is 20% in this example. Pumps 320, 322 are shown driving the flows of liquid desiccant, although the number and location of pumps can vary from what is shown here. Generally, one pump may be used for each SUPER cell that is used in a different stage of processing. Other pumps (not shown) may be used to drive the redox shuttle in the SUPER cells 300, 302.

As with the arrangement shown in FIG. 1, the system shown in FIG. 3 incudes at least one heat transfer element for accepting heat 324 from the LAMEE 304 and/or input heat 326 to the SUPER cells 300, 302 and/or fluids pumped through the cells 300, 302. Note that the heat 326 may be applied to a single stage of the SUPER cells 300, 302 (e.g., cell 300 or 302 but not both) where the application of heat will have the greatest impact on efficiency. This may include applying the heat 326 to just a subcomponent of the single one of the SUPER cells 300, 302. For systems with more than two stages (e.g., N-stages where N>2), a subset of the two or more stages may be heated, where the subset ranges from one stage to N–1 stages. Any stages not in the subset are not directly heated by heat 326, although some indirect heating may occur due to circulation of liquid desiccant and the like. The input of heat 326 to the SUPER cells 300, 302 can be accomplished in several ways. A hot side of a secondary heat pump can be brought into thermal contact with the SUPER electrochemical regenerator cells, such as through conductive heat transfer through the casing, electrodes, membranes, etc.

Figure 4A:
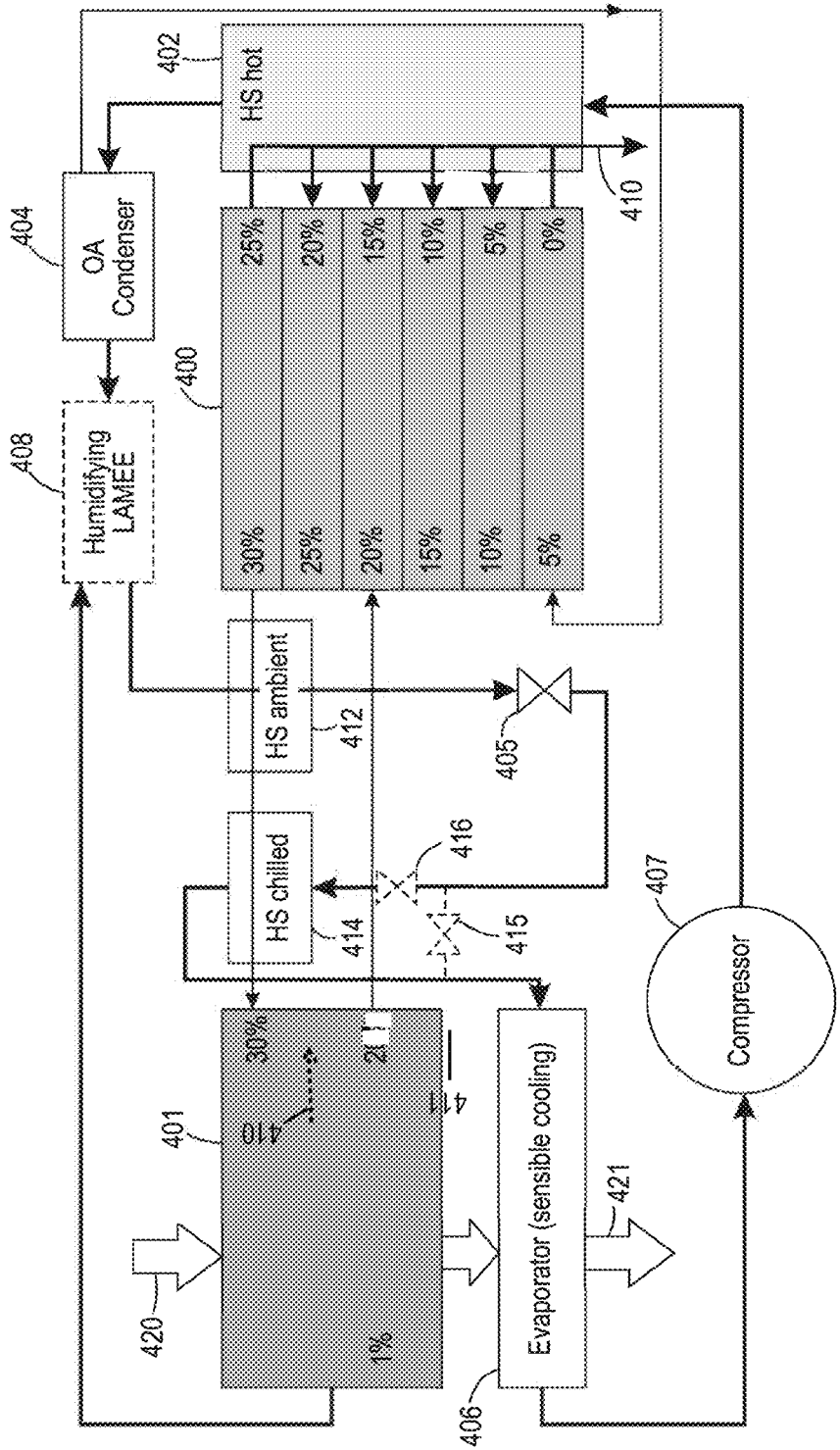
FIGS. 4A, 4B and 5 are diagrams showing secondary heat pumps integrated into a liquid desiccant regeneration system according to example embodiments.
Figure 4B:
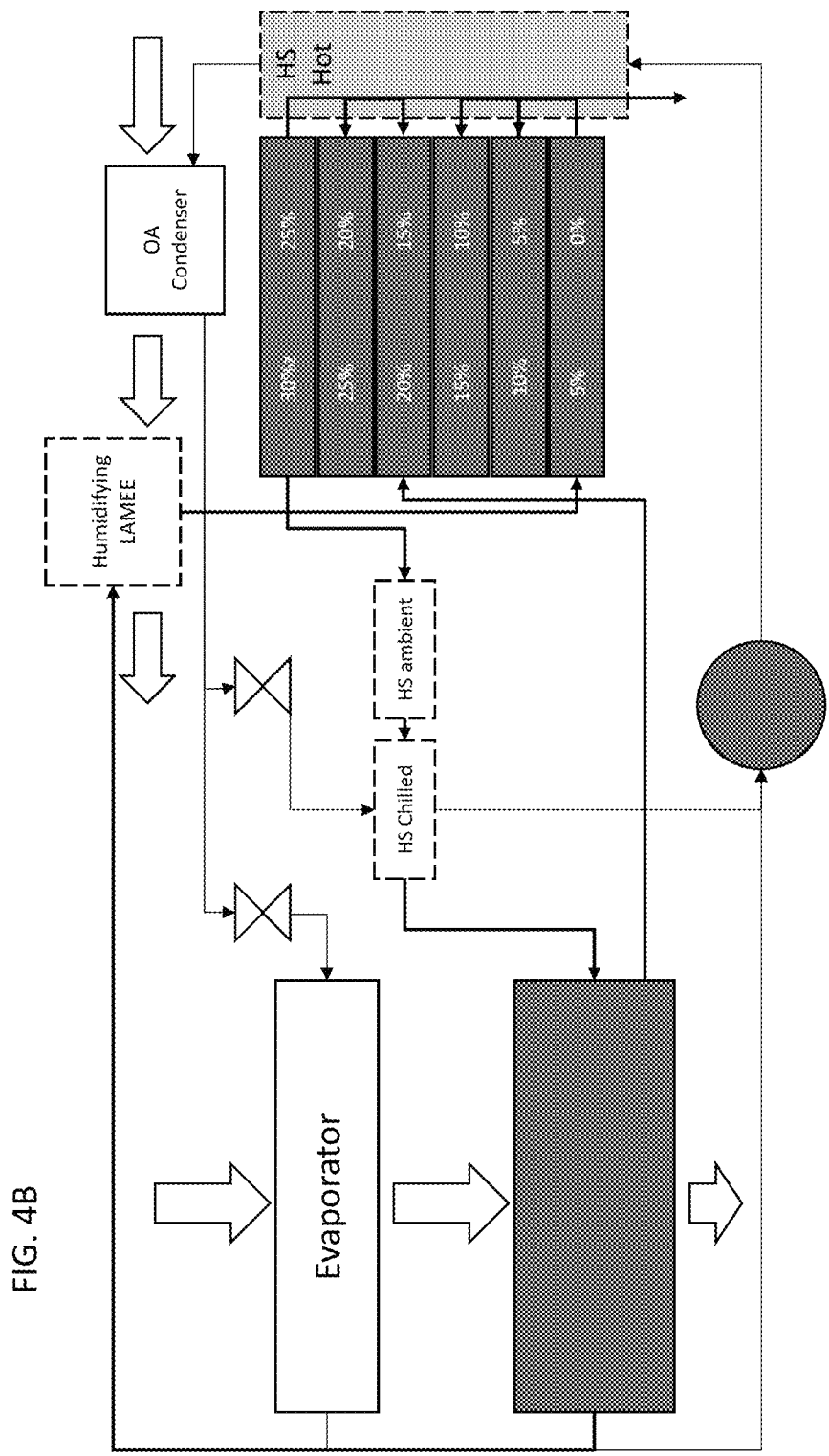

In FIG. 4A, a block diagram shows a liquid desiccant regeneration system with secondary heat pumping according to an example embodiment. A SUPER cell stack 400 includes three cells, each increasing or decreasing salinity within its channels by about 5% (compared to about 10% in the stack 301 shown in FIG. 3). The SUPER cell stack 400 regenerates solution for a dehumidifying LAMEE 401. As noted above, the electrochemical regeneration performed by the SUPER stack 400 with certain desiccants produces a cooling effect. A hot side of a secondary heat pump includes a heat exchanger 402 that rejects heat to liquid desiccant flowing through the SUPER stack 400. In this example, the secondary heat pump is coupled to a primary VC heat pump refrigerant loop, which includes an OA condenser 404, an expansion valve 405, an evaporator 406, and compressor 407. An air conditioning refrigerant, for example, can be used as a working fluid by both the primary and secondary heat pump. FIG. 4B also shows a block diagram of a liquid desiccant regeneration system with secondary heat pumping, but with the expansion valves routed in parallel to the evaporator and air contactor(s) (i.e., one or more air contactors), and the evaporator disposed upstream the air contactor to precool the air stream entering the air contactor(s), according to an example embodiment. Further, as shown in dotted lines in FIG. 4B, various components are optional, and so in other example embodiments, those components shown in dotted lines could be excluded from the system.

The hot side heat exchanger 402 of the secondary heat pump will offset some of the cooling effect in the SUPER stack 400. The SUPER stack 400 experiences reduced electrical and ionic resistance at higher temperatures leading to reduced losses at higher temperature. The hot side heat exchanger 402 also lowers the hot side temperature of the vapor compression loop before it reaches the condenser 404, which has direct thermodynamic benefits for the primary heat pump. The thermal contact between the SUPER stack 400 and the hot side heat exchanger 402 can be achieved via direct integration (e.g., heat conduction to solid components of the stack), indirect integration (e.g., via conduction and/or convective heat transfer to fluid pumped into the stack) or some combination thereof. This can be accomplished using direct contact to the refrigerant (which is pumped by the compressor 407) or with a third fluid loop (not shown).

It is anticipated that in some cases the SUPER cell stack 400 cannot absorb all the heat from the secondary heat pump. In other embodiments, the hot side of the heat pump can be coupled (directly or indirectly) with a secondary air contactor, such as humidifying LAMEE 408 which desorbs water from a liquid desiccant to an airflow (not shown) resulting in a lowering of temperature of the liquid desiccant. In other embodiments, the outlet fluid 410 of the SUPER cell stack, which has a very low concentration solution outlet stream, can be reused in the system by being fed into the humidifying LAMEE 408, which outputs a more concentrated liquid desiccant stream 411. Using the hot side of the heat pump, this outlet fluid 410 could be regenerated even if the ambient humidity levels were at 100%. This provides unique benefit to the regenerator that the SUPER cell stack 400 would no longer need a drain, in that the outlet fluid 410 would be reconcentrated by the humidifying LAMEE 408 and be fed back into the SUPER cell stack 400. In cases of sub-100% humidity, the heat pump would benefit from evaporative cooling lowering the temperature span of the secondary heat pump and increasing its efficiency.

In another embodiment, the dehumidifying LAMEE 401 is brought into thermal contact with the cold side of the heat pump, as indicated by heat exchangers 412 before the expansion valve 405 and the heat exchanger 414 after the expansion valve 405. The amount of cooling provided could be adjusted, e.g., by utilizing optional variable bypass valves 415, 416, which in this example, regulate the flow through heat exchanger 414. A similar valve arrangement could be used to regulate the flow through heat exchangers 402, 412 or any other component of the secondary heat pump. The valves could be linked to a system controller that monitors system temperatures and automatically adjusts the valves to maintain one or more desired operating points.

Cooling of the LAMEE input flow would allow the SUPER cell stack to operate at lower salt concentrations due to increased RH at lower temperatures of the LAMEE 401. Lowering salt concentrations would increase the efficiency of the SUPER cell stack 400. Additionally, the secondary heat pump can directly control outlet temperature in the LAMEE air contactor negating the need for a separate heat exchanger, and possibly reducing overall system costs. The illustrated evaporator 406 provides sensible cooling for the primary airflow, e.g., before or after passing through the LAMEE 401.

Figure 5:
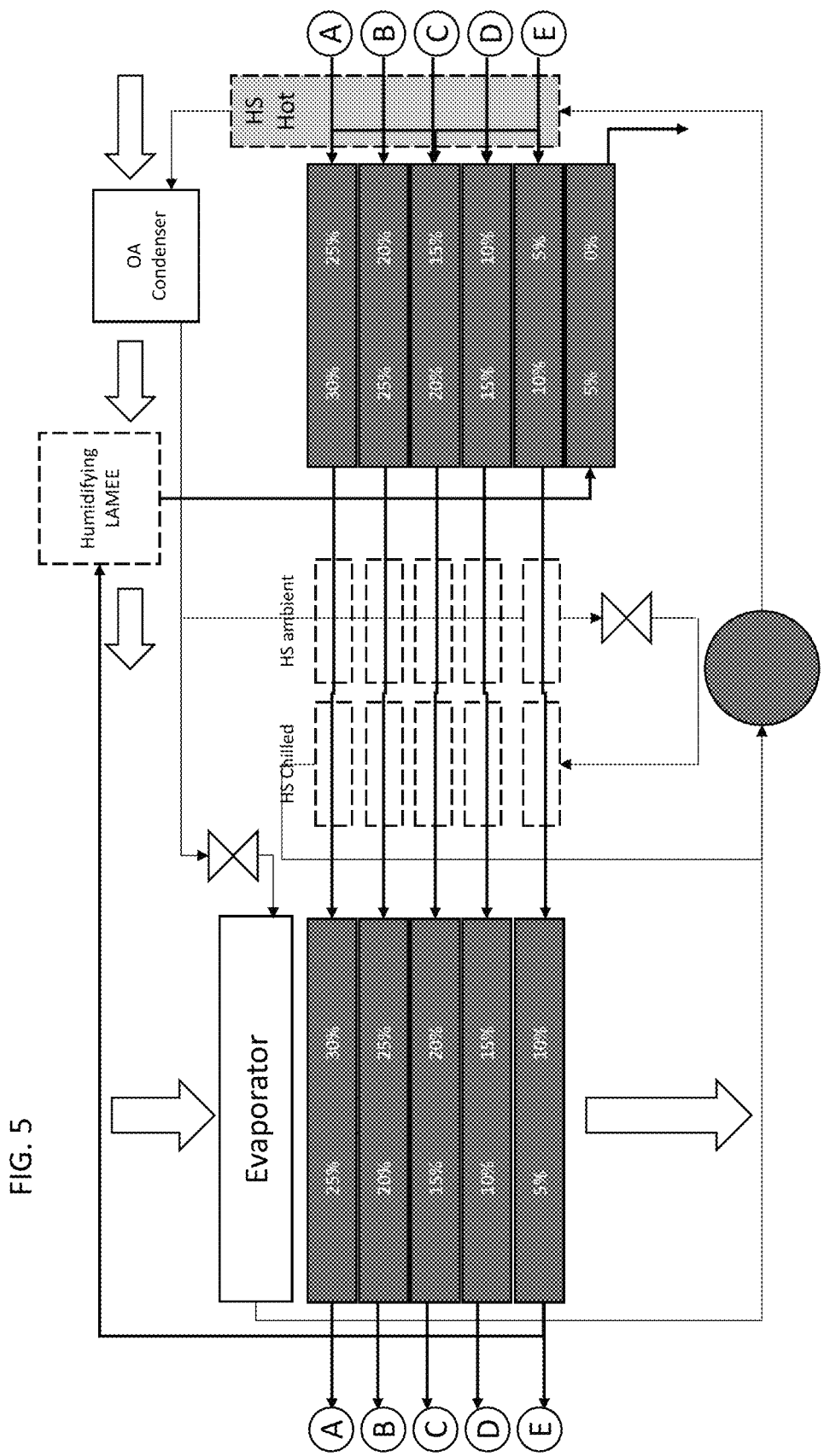

In FIG. 5, a block diagram shows a liquid desiccant regeneration system with secondary heat pumping according to another example embodiment. The primary and secondary heat pump components work similar in this example, however a three-cell SUPER stack 500 feeds multiple stages of liquid desiccant to a four-stage dehumidification LAMEE 501. In this arrangement, cold side heat exchangers 512, 514 may have multiple independent heat exchange sections for each of the different SUPER-to-LAMEE desiccant flows. This system could use a humidifying LAMEE to absorb heat as shown in FIG. 5, as well as control valves to regulate the secondary heat pump.

In some desiccant technologies, the heat pump is used to accept the latent heat of condensation from the dehumidifier. This is shown in FIG. 5, where outside air plus return air 520 is input to the evaporator 406 before being passed through the dehumidifying LAMEE 501 and output as low RH cooled delivery air 521. The evaporator 406 may need to overcool the air sent to the LAMEE 501 to account for the latent heat of liquid dehumidification. The latent heat absorbed in this way is the rejected to the ambient at the condenser 404. If the liquid desiccant of the dehumidifying LAMEE 501 is kept close to the target temperature of the delivery air 521, then the air is conditioned on leaving the dehumidifier. This prevents overcooling and lets the conditioning process take place at a higher average conditioning temperature improving efficiency.

Alternatively, the evaporator can be placed downstream of the dehumidifier. This is shown in FIG. 4A, where outside air plus return air 420 is input to the dehumidifying LAMEE 401 before being passed through the evaporator 406 where it becomes low RH delivery air 421. This configuration eliminates water condensation on the evaporator 406, increasing its efficiency and lowering its air pressure drop, reducing the fan work of the system. Note that the airflow directions in FIGS. 4 and 5 are presented for purposes of illustration, and either embodiment (as well as other embodiments described herein) may use either airflow direction relative to a dehumidifier and an evaporator.

Figure 6:
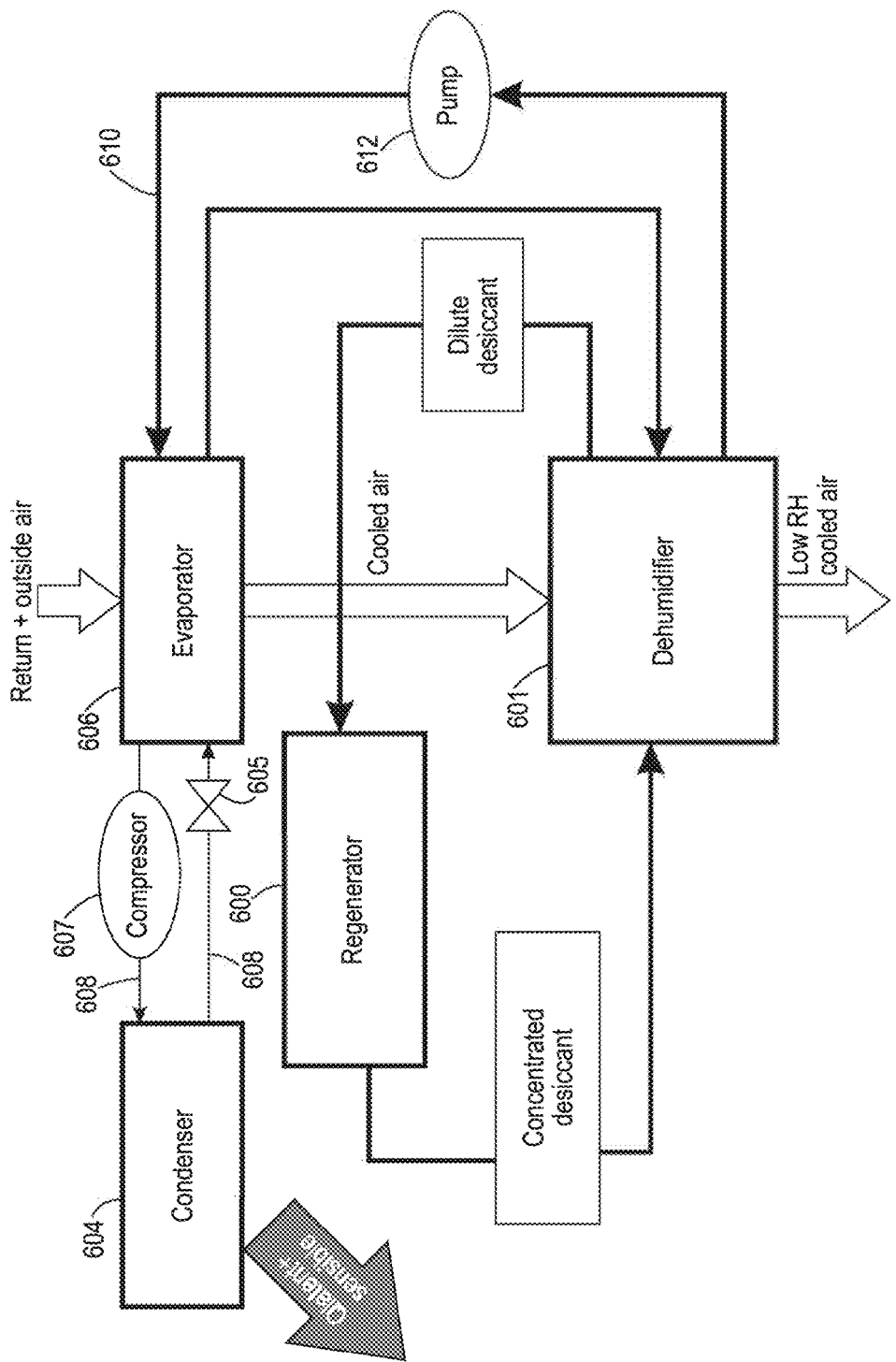
FIGS. 6 and 7 are diagrams showing different arrangements of a liquid desiccant system in a cooling system according to example embodiments.

To operate at the highest possible evaporator temperature and minimize desiccant system size, a pre-evaporator cooling to the dehumidifier can be used. In FIG. 6, a block diagram shows a liquid desiccant regeneration system with pre-evaporator cooling according to an example embodiment. A SUPER regenerator stack 600 feeds a dehumidification LAMEE 601. A vapor compression heat pump includes an OA condenser 604, an expansion valve 605, an evaporator 606, a compressor 607, and refrigerant loop 608. To operate at the highest possible evaporator temperature and minimize desiccant system size, a pre-evaporator cooling element can extract heat from the dehumidification LAMEE 601. In FIG. 6, this pre-evaporator and cooling element is shown, for example, by a fluid loop 610 and pump 612. The fluid in the fluid loop could be the liquid desiccant, or a different fluid (e.g., water, ethylene glycol, etc.) may be used and transferred to the LAMEE 601 via a heat exchanger.

Figure 7:
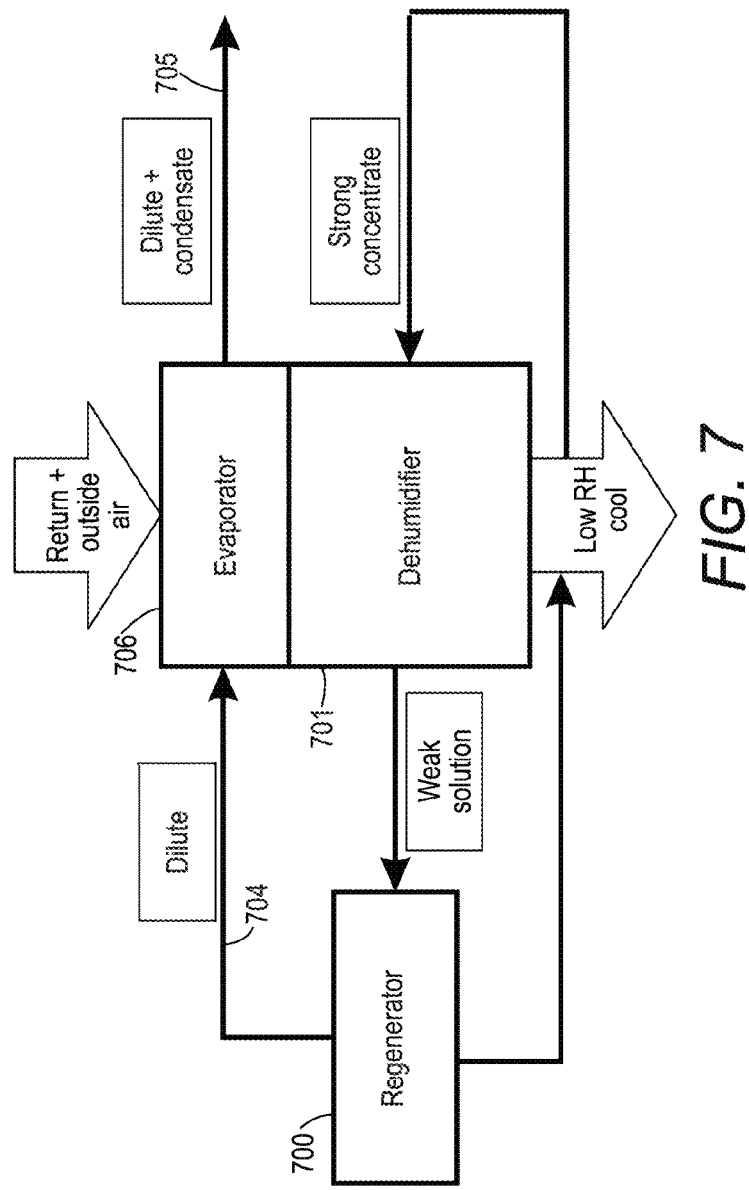

The evaporator 606 no longer needs to cool below the target outlet temperature but a significant amount of moisture may be removed on the evaporator 606 at no additional energy cost. The dehumidifier 601 can still be reduced in size due to condensing on the pre-evaporator. If the liquid desiccant regenerator 600 is a SUPER stack, then the dilute solution can be further diluted by the evaporator condensate, as shown in FIG. 7. In FIG. 7, and evaporator 706 and dehumidifier 701 form single air contactor that has a first section (the evaporator 706) which both cools and condenses to the delivery temperature. The second section (the dehumidifier) performs constant temperature dehumidification. The two sections are in thermal contact using any combination of heat pipes, two-phase flow, single phase flow, conduction, etc. A regenerator 700 regenerates the liquid desiccant. If using a SUPER stack for the regenerator 700, than the dilute stream 704 from the regenerator is combined with condensate at the evaporator 706, resulting in a further diluted output stream 705. This stream 704 could be used to "clean" the evaporator 706 and adds a pressurized outflow from the evaporator 706. Note that certain components of a VC system (e.g., condenser, compressor) would be used with the evaporator 706, but are not shown in this view. Features shown in FIGS. 6 and 7 (e.g., fluid loop 612 and dilute stream 704) can be added to previously described embodiments in FIGS. 1 and 3-5.

Note that in the embodiments disclosed above, a heat pump is shown in with an evaporator that absorbs heat and a condenser that outputs heat. In any of these embodiments, the evaporator can be replaced with a chilled solution heat exchanger and/or the condenser can be replaced with a heated solution heat exchanger. The chilled and heated solutions may include water, water/glycol solution, saline solution, etc. The heat pump may still include a vapor compression system with an evaporator and condenser, but heat transfer is effected through the circulation of the solution through the system rather than direct contact with the evaporator and condenser.

Figure 8:
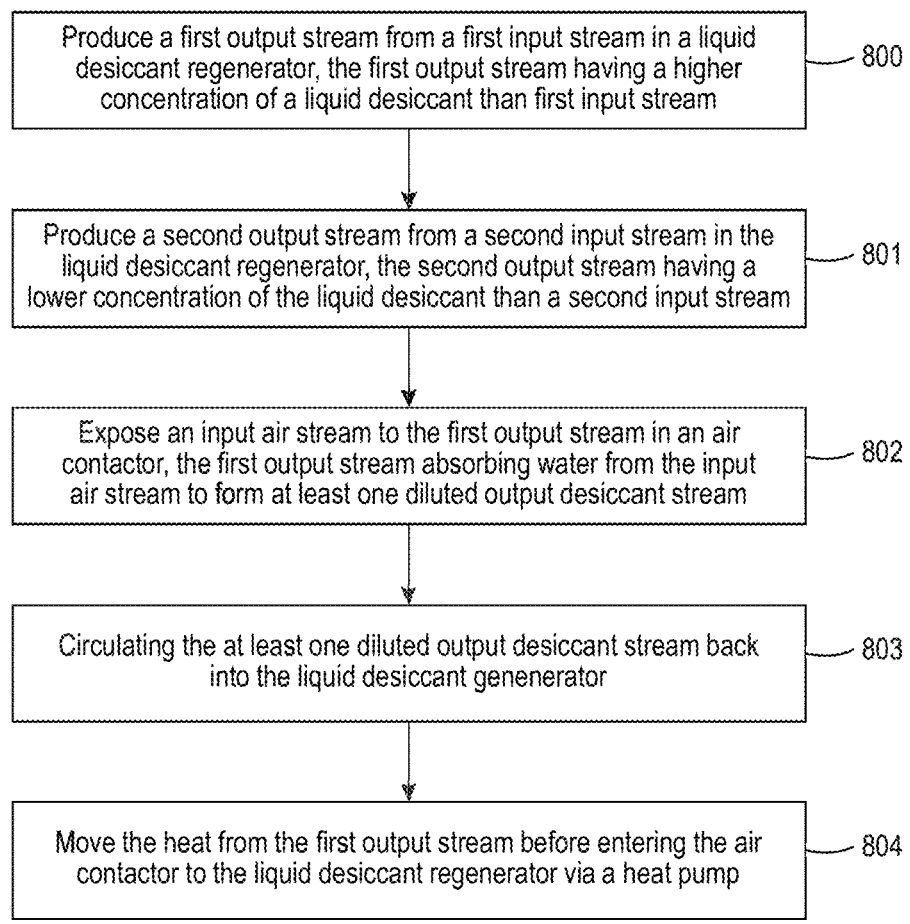
FIG. 8 is a flow diagram of a method in accordance with certain embodiments.

In FIG. 8, a flow diagram shows a method according to an example embodiment. The method involves producing 800 a first output stream from a first input stream in a liquid desiccant regenerator, the first output stream having a higher concentration of a liquid desiccant than first input stream. A second output stream is produced 801 from a second input stream. The second output stream has a lower concentration of the liquid desiccant than a second input stream. An input air stream is exposed 802 to the first output stream in an air contactor. The first output stream absorbs water from the input air stream to form at least one diluted output desiccant stream. The at least one diluted output desiccant stream is circulated 803 back into the liquid desiccant regenerator. Heat is moved 804 from the first output stream before entering the air contactor to the liquid desiccant regenerator via a heat pump.

In summary, systems and methods are described that can reduce energy consumption in electrochemically regenerated dehumidification and air conditioning systems, extend system performance, and enable co-located sensible heating and cooling with separate control. In one embodiment, a secondary heat pump is used to adjust the operating conditions of an electrochemically regenerated liquid desiccant system. An electrochemically regenerated liquid desiccant dehumidifier has at least one air contactor for dehumidifying air where a secondary heat pump system is utilized to control the water vapor absorption temperature, the regeneration temperature or a combination of both. The regeneration temperature can be controlled directly in the regenerator, in one or more air contactors used for humidification, or a combination of both.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range. All descriptions of solute concentrations by percentage are meant to describe percentage by weight unless otherwise indicated.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system, comprising:
    a liquid desiccant regenerator configured to produce:
        a first output stream from a first input stream, the first output stream having a higher concentration of a liquid desiccant than the first input stream; and
        a second output stream from a second input stream, the second output stream having a lower concentration of the liquid desiccant than the second input stream;
    an evaporator configured to be coupled to and remove heat from an input air stream to produce a cooled input air stream;
    an air contactor coupled to the first output stream and the cooled input air stream to expose the cooled input air stream to the first output stream such that the first output stream absorbs water from the cooled input air stream to form a diluted output desiccant stream and dehumidified output air stream, wherein the diluted output desiccant stream is circulated back into the liquid desiccant regenerator; and
    a heat pump configured to be thermally coupled the first output stream to move heat from the first output stream to the liquid desiccant regenerator, the heat moved to the liquid desiccant regenerator increasing an efficiency of the liquid desiccant regenerator.

2. The system of claim 1, wherein the heat is moved from the first output stream before entering the air contactor or as the first output stream enters the air contactor, the movement of heat from the first output stream reducing a water vapor absorption temperature of the liquid desiccant in the air contactor.

3. The system of claim 1, wherein the heat moved from the first output stream is applied to a subset of components of the liquid desiccant regenerator to cause a temperature gradient inside the of the liquid desiccant regenerator.

4. The system of claim 1, wherein the heat moved from the first output stream is applied to a one or more fluid streams inside the liquid desiccant regenerator.

5. The system of claim 1, wherein the air contactor is a first air contactor and the input air stream is a first input air stream, the system further comprising a second air contactor operable to desorb moisture from the second output stream into a second air stream, the desorbing of the moisture lowering a temperature of the second air contactor, the heat pump further thermally coupled to move part of the heat from the first output stream to the second air contactor.

6. The system of claim 1, wherein the heat pump includes a vapor compression heat pump having a refrigerant loop between a condenser and the evaporator, the evaporator configured to cool at least one of the input air stream entering the air contactor or the dehumidified output air stream exiting the air contactor, the heat pump further including a first heat exchanger that thermally couples a hot side of the refrigerant loop to the liquid desiccant regenerator and a second heat exchanger that thermally couples a cold side of the refrigerant loop to the first output stream.

7. The system of claim 6, wherein each one of the second heat exchanger and the evaporator includes an expansion valve, and the expansion valves are disposed in parallel.

8. The system of claim 6, wherein each one of the second heat exchanger and the evaporator includes an expansion valve, and the expansion valves are disposed in series.

9. The system of claim 1, wherein the liquid desiccant regenerator includes two or more stages, each subsequent stage being configured to produce an output stream having a concentration of the liquid desiccant higher than a corresponding output of a previous stage, the first output stream corresponding to the output stream of the two or more stages having a highest concentration of the liquid desiccant.

10. The system of claim 9, wherein a subset of the two or more stages are heated by the heat pump and any of the two or more stages that are not in the subset are not directly heated by the heat pump.

11. The system of claim 9, wherein the liquid desiccant regenerator is driven by an electric potential that engenders faradaic reactions happening at two different electrodes and a redox material undergoing the faradaic reactions is circulated between the two different electrodes, and a resulting third liquid desiccant stream, having desorbed moisture and thus increased a desiccant concentration of the third liquid desiccant stream, is returned to the liquid desiccant regenerator.

12. A system, comprising:
a liquid desiccant regenerator configured to produce:
a first output stream from a first input stream, the first output stream having a higher concentration of a liquid desiccant than the first input stream; and
a second output stream from a second input stream, the second output stream having a lower concentration of the liquid desiccant than the second input stream;
an air contactor coupled to the first output stream and exposing an input air stream to the first output stream, the first output stream absorbing water from the input air stream to form a diluted output desiccant stream and a dehumidified air stream, wherein the diluted output desiccant stream is circulated back into the liquid desiccant regenerator;
an evaporator configured to be coupled to and remove heat from the dehumidified air stream to produce a cooled dehumidified air stream; and
a heat pump configured to be thermally coupled to the first output stream to move the heat from the first output stream to the liquid desiccant regenerator, the heat moved to the liquid desiccant regenerator increasing an efficiency of the liquid desiccant regenerator.

13. The system of claim 12, wherein the heat is moved from the first output stream before entering the air contactor or as the first output stream enters the air contactor, the movement of heat from the first output stream reducing a water vapor absorption temperature of the liquid desiccant in the air contactor.

14. The system of claim 12, wherein the heat moved from the first output stream is applied to a subset of components of the liquid desiccant regenerator to cause a temperature gradient inside the of the liquid desiccant regenerator.

15. The system of claim 12, wherein the heat moved from the first output stream is applied to a one or more fluid streams inside the liquid desiccant regenerator.

16. The system of claim 12, wherein the heat pump comprises a vapor compression heat pump having a refrigerant loop between a condenser and an evaporator, the evaporator used to cool at least one of the input air stream entering the air contactor or a dehumidified output stream exiting the air contactor, the heat pump further comprising a first heat exchanger that thermally couples a hot side of the refrigerant loop to the liquid desiccant regenerator and a second heat exchanger that thermally couples a cold side of the refrigerant loop to the first output stream.

17. The system of claim 12, wherein the heat pump comprises a vapor compression heat pump generating a chilled solution and a heated solution, the chilled solution being used to cool at least one of the input air stream entering the air contactor and a dehumidified output stream exiting the air contactor, and the heated solution being thermally coupled to the liquid desiccant regenerator.

18. The system of claim 17, wherein at least part of the second output stream is combined with condensate at the evaporator resulting in a further diluted stream being output from the evaporator.

19. The system of claim 12, wherein the air contactor is a first air contactor and the input air stream is a first input air stream, the system further comprising a second air contactor operable to desorb moisture from a second liquid desiccant stream into a second air stream, the desorbing of the moisture lowering a temperature of the second air contactor, the heat pump being further thermally coupled to move part of the heat from the first output stream to the second air contactor.

20. The system of claim 12, wherein the liquid desiccant regenerator comprises two or more stages, each subsequent stage being configured to produce an output stream having a concentration of the liquid desiccant higher than a corresponding output of a previous stage, the first output stream corresponding to the output stream of the two or more stages having a highest concentration of the liquid desiccant.

21. The system of claim 20, wherein a subset of the two or more stages are heated by the heat pump and any of the two or more stages that are not in the subset are not directly heated by the heat pump.

22. The system of claim 20, wherein the liquid desiccant regenerator is driven by an electric potential that engenders faradaic reactions happening at two different electrodes and a redox material undergoing the faradaic reactions is circulated between the two different electrodes.

23. A system, comprising:
a liquid desiccant regenerator configured to produce a series of output streams with each output stream from the series of output streams configured to possess a different concentration of liquid desiccant;

an evaporator configured to be coupled to and remove heat from a first input air stream to produce a first cooled input air stream;
a series of air contactors with each air contactor configured to be coupled to one or more of the series of output streams to form a diluted output desiccant stream and an input air stream to form a dehumidified output air stream, wherein:
each of the output streams is coupled to one and only one of the air contactors from the series of air contactors;
the diluted output desiccant stream is circulated back into the liquid desiccant regenerator;
a first air contactor from the series of air contactors is coupled to the first cooled input air stream, each subsequent air contactor is coupled to a dehumidified output airstream formed by an upstream air contactor; and
a final air contactor in the series of air contactors producing a dehumidified air stream.

24. The system of claim 23, where the series of air contactors and the series of output streams are ordered such that the first air contactor from the series of air contactors has a lowest concentration, and the final air contactor from the series of air contactors has a highest concentration, and the air contactors between the first air contactor and the final air contactor are arranged in increasing concentration.

25. The system of claim 23, further comprising a heat pump thermally coupled to move heat from the series of output streams to the liquid desiccant regenerator, the heat moved to the liquid desiccant regenerator increasing an efficiency of the liquid desiccant regenerator.

26. The system of claim 25, wherein:
the diluted output desiccant stream is a first diluted output desiccant stream;
the series of air contactors includes an air contactor operable to desorb moisture from the first diluted output desiccant stream into a second air stream, the desorbing of the moisture producing (1) a second diluted output desiccant stream having an increased desiccant concentration and (2) lowering a temperature of that air contactor;
the heat pump being further thermally coupled to move part of the heat from the series of output streams to that second air contactor;
and the second diluted output desiccant stream being returned to the liquid desiccant regenerator.

27. The system of claim 25, wherein the heat pump includes a vapor compression heat pump having a refrigerant loop between a condenser and an evaporator, the evaporator used to cool at least one of the input air stream entering the air contactor or a dehumidified output air stream exiting the air contactor, the heat pump further including a first heat exchanger that thermally couples a hot side of the refrigerant loop to the liquid desiccant regenerator and a series of second heat exchangers that thermally couple a cold side of the refrigerant loop to the series of output streams.

28. The system of claim 27, wherein each one of the second heat exchanger and the evaporator includes an expansion valve, and the expansion valves are disposed in parallel.

29. The system of claim 27, wherein each one of the second heat exchanger and the evaporator includes an expansion valve, and the expansion valves are disposed in series.

30. The system of claim 23, wherein the liquid desiccant regenerator includes two or more stages, each subsequent stage being configured to produce an output stream having a concentration of the liquid desiccant higher than a corresponding output of a previous stage, the first output stream corresponding to the output stream of the two or more stages having a highest concentration of the liquid desiccant.

31. The system of claim 30, wherein the liquid desiccant regenerator is driven by an electric potential that engenders faradaic reactions happening at two different electrodes and a redox material undergoing the faradaic reactions is circulated between the two different electrodes.

32. The system of claim 23, further comprising a second air contactor operable to desorb moisture from a second series of liquid desiccant streams into a second air stream, the desorbing of the moisture lowering a temperature of the second air contactor, a heat pump further thermally coupled to move part of the heat from the first output stream to the second air contactor, and a resulting third series of liquid desiccant streams, having desorbed moisture and thus increased the desiccant concentration of the resulting third series of liquid desiccant streams, are returned to the liquid desiccant regenerator.

33. A system, comprising:
a liquid desiccant regenerator configured to produce:
a first output stream from a first input stream, the first output stream having a higher concentration of a liquid desiccant than the first input stream; and
a second output stream from a second input stream, the second output stream having a lower concentration of the liquid desiccant than the second input stream;
the liquid desiccant regenerator comprising two or more stages, each subsequent stage being configured to produce an output stream having a concentration of the liquid desiccant higher than a corresponding output of a previous stage, the first output stream corresponding to the output stream of the two or more stages having a highest concentration of the liquid desiccant;
an air contactor coupled to the first output stream and exposing an input air stream to the first output stream, the first output stream absorbing water from the input air stream to form a diluted output desiccant stream and a dehumidified air stream, wherein the diluted output desiccant stream is circulated back into the liquid desiccant regenerator;
an evaporator configured to be coupled to and remove heat from the dehumidified air stream to produce a cooled dehumidified air stream; and
a heat pump configured to be thermally coupled to the first output stream to move the heat from the first output stream to the liquid desiccant regenerator, the heat moved to the liquid desiccant regenerator increasing an efficiency of the liquid desiccant regenerator;
wherein a subset of the two or more stages are heated by the heat pump and any of the two or more stages that are not in the subset are not directly heated by the heat pump.

* * * * *